(12) United States Patent
Wood et al.

(10) Patent No.: US 11,787,627 B2
(45) Date of Patent: *Oct. 17, 2023

(54) POLYMERIC BAGS AND METHOD TO MAKE SAME

(71) Applicant: Poly-America, L.P., Grand Prairie, TX (US)

(72) Inventors: Gregory James Wood, Carrollton, TX (US); Anthony H. Bertrand, Flint, TX (US)

(73) Assignee: Poly-America, L.P., Grand Prairie, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,867

(22) Filed: Nov. 10, 2022

(65) Prior Publication Data

US 2023/0070325 A1 Mar. 9, 2023

Related U.S. Application Data

(60) Continuation of application No. 17/016,533, filed on Sep. 10, 2020, now Pat. No. 11,548,726, which is a
(Continued)

(51) Int. Cl.
| | |
|---|---|
| *B65D 33/28* | (2006.01) |
| *B65F 1/00* | (2006.01) |
| *B65D 30/08* | (2006.01) |
| *B31B 70/00* | (2017.01) |
| *B31B 70/81* | (2017.01) |
| *B31B 155/00* | (2017.01) |
| *B31B 170/30* | (2017.01) |
| *B31B 160/10* | (2017.01) |

(Continued)

(52) U.S. Cl.
CPC .......... *B65F 1/0006* (2013.01); *B31B 70/008* (2017.08); *B31B 70/8135* (2017.08); *B65D 31/04* (2013.01); *B65D 33/28* (2013.01); *B65F 1/002* (2013.01); *B29C 59/022* (2013.01); *B29C 59/04* (2013.01); *B31B 2155/003* (2017.08); *B31B 2160/10* (2017.08); *B31B 2170/30* (2017.08)

(58) Field of Classification Search
CPC ........ B65F 1/0006; B65D 31/04; B65D 33/28
USPC .......................................................... 383/75
See application file for complete search history.

(56) References Cited

U.S. PATENT DOCUMENTS 2,037,175 A * 4/1936 Northcross ............. A61J 19/00
383/43
3,283,672 A * 11/1966 Mueller .................. B31B 70/00
493/203

(Continued)

*Primary Examiner* — Peter N Helvey
(74) *Attorney, Agent, or Firm* — Daniel J. Layden

(57) ABSTRACT

The present invention is directed to a bag of polymeric film and a method to make the bag. The bag can be comprised of a front panel and a rear panel. The front and rear panels can each be comprised of multiple layers of film. The bag can be formed from a collapsed bubble of polymeric film that has been folded in half so that opposing edges of the collapsed bubble form an opening of the bag. One of the layers of the folded bubble can be split adjacent to an edge of the collapsed bubble and a draw tape film can be inserted between the layers of the folded and collapsed bubble. The collapsed bubble can further be embossed by a pattern that can provide enhanced properties to bags formed from the folded bubble.

18 Claims, 20 Drawing Sheets

Figure 2A:

Related U.S. Application Data division of application No. 15/712,543, filed on Sep. 22, 2017, now abandoned.

(51) Int. Cl.
*B29C 59/02* (2006.01)
*B29C 59/04* (2006.01)

(56) References Cited

U.S. PATENT DOCUMENTS

| | | | | |
|---|---|---|---|---|
| 3,772,968 A * | 11/1973 | Ruda | B65D 33/28 | 493/224 |
| 3,917,160 A * | 11/1975 | Olerud | G03C 3/003 | 383/111 |
| 3,939,972 A * | 2/1976 | Mayworm | B65D 31/04 | 206/245 |
| 4,691,368 A * | 9/1987 | Roessiger | B65D 33/24 | 383/93 |
| 4,704,101 A * | 11/1987 | Schirmer | B65D 31/04 | 493/197 |
| 4,854,736 A * | 8/1989 | McVeigh | B65D 31/04 | 383/110 |
| 4,890,936 A * | 1/1990 | Cooper | B65D 31/04 | 383/114 |
| 4,951,666 A * | 8/1990 | Inman | A61F 7/103 | 383/111 |
| 5,078,508 A * | 1/1992 | Johan | B65F 1/0006 | 383/119 |
| 5,501,525 A * | 3/1996 | Cox | B65D 81/2084 | 53/512 |
| 5,660,868 A * | 8/1997 | Yeager | B65D 81/264 | 426/112 |
| 5,716,137 A * | 2/1998 | Meyer | B65D 33/28 | 493/225 |
| 6,550,966 B1 * | 4/2003 | Saad | B65D 31/04 | 426/418 |
| 7,712,962 B1 * | 5/2010 | Reuhs | B65D 33/2508 | 383/105 |
| 7,914,207 B1 * | 3/2011 | Beam | B65D 33/28 | 220/495.11 |
| 8,568,283 B2 * | 10/2013 | Broering | B31B 70/81 | 493/344 |
| 8,574,142 B2 * | 11/2013 | Broering | B31B 70/262 | 493/383 |
| 8,603,609 B2 * | 12/2013 | Fraser | B32B 7/05 | 428/167 |
| 8,888,365 B2 * | 11/2014 | Fraser | B32B 7/14 | 383/105 |
| 8,940,377 B2 * | 1/2015 | Fraser | B29C 66/1122 | 383/105 |
| 9,050,783 B2 * | 6/2015 | Borchardt | B31B 70/00 | |
| 9,114,596 B2 * | 8/2015 | MacPherson | B32B 27/306 | |
| 9,186,862 B2 * | 11/2015 | Broering | B32B 7/05 | |
| 9,381,718 B2 * | 7/2016 | Dorsey | B32B 27/32 | |
| 9,387,955 B2 * | 7/2016 | Broering | B65F 1/002 | |
| 9,637,278 B2 * | 5/2017 | Borchardt | B65D 33/28 | |
| 9,669,595 B2 * | 6/2017 | Borchardt | B32B 27/32 | |
| 9,950,830 B2 * | 4/2018 | de Lesseux | B65D 81/3897 | |
| 10,889,431 B2 * | 1/2021 | Cobler | B65F 1/0026 | |
| 2001/0043763 A1 * | 11/2001 | Saad | B65D 31/04 | 383/111 |
| 2005/0084184 A1 * | 4/2005 | Withers | B65D 33/002 | 383/77 |
| 2012/0057811 A1 * | 3/2012 | Tucker | B65D 31/04 | 383/72 |
| 2013/0188889 A1 * | 7/2013 | Fraser | B65F 1/0006 | 383/37 |
| 2013/0188891 A1 * | 7/2013 | Maxwell | B65F 1/002 | 383/114 |
| 2016/0016751 A1 * | 1/2016 | Binger | B29C 48/10 | 242/525 |
| 2017/0266860 A1 * | 9/2017 | Wood | B29C 48/10 | |

* cited by examiner

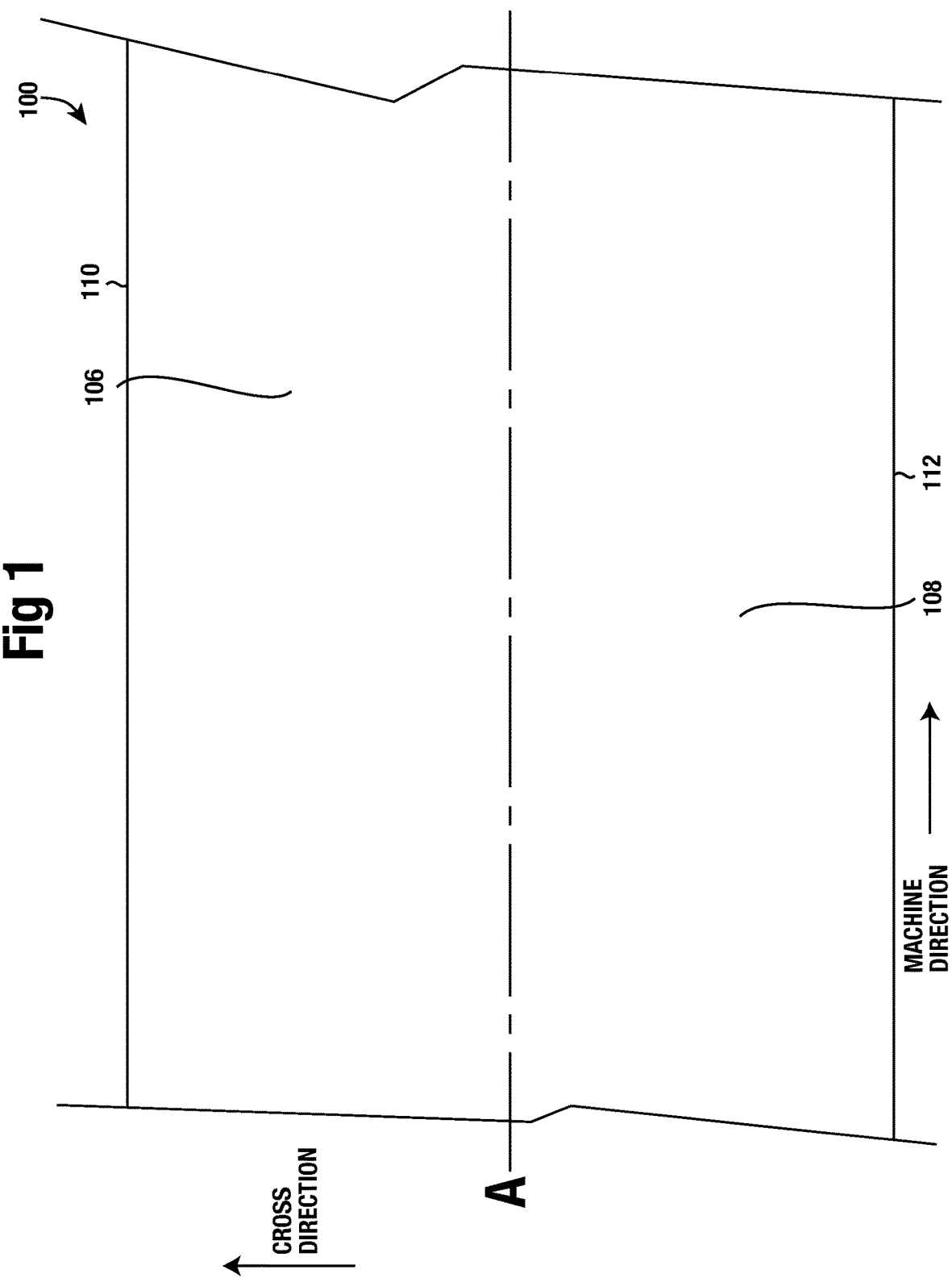

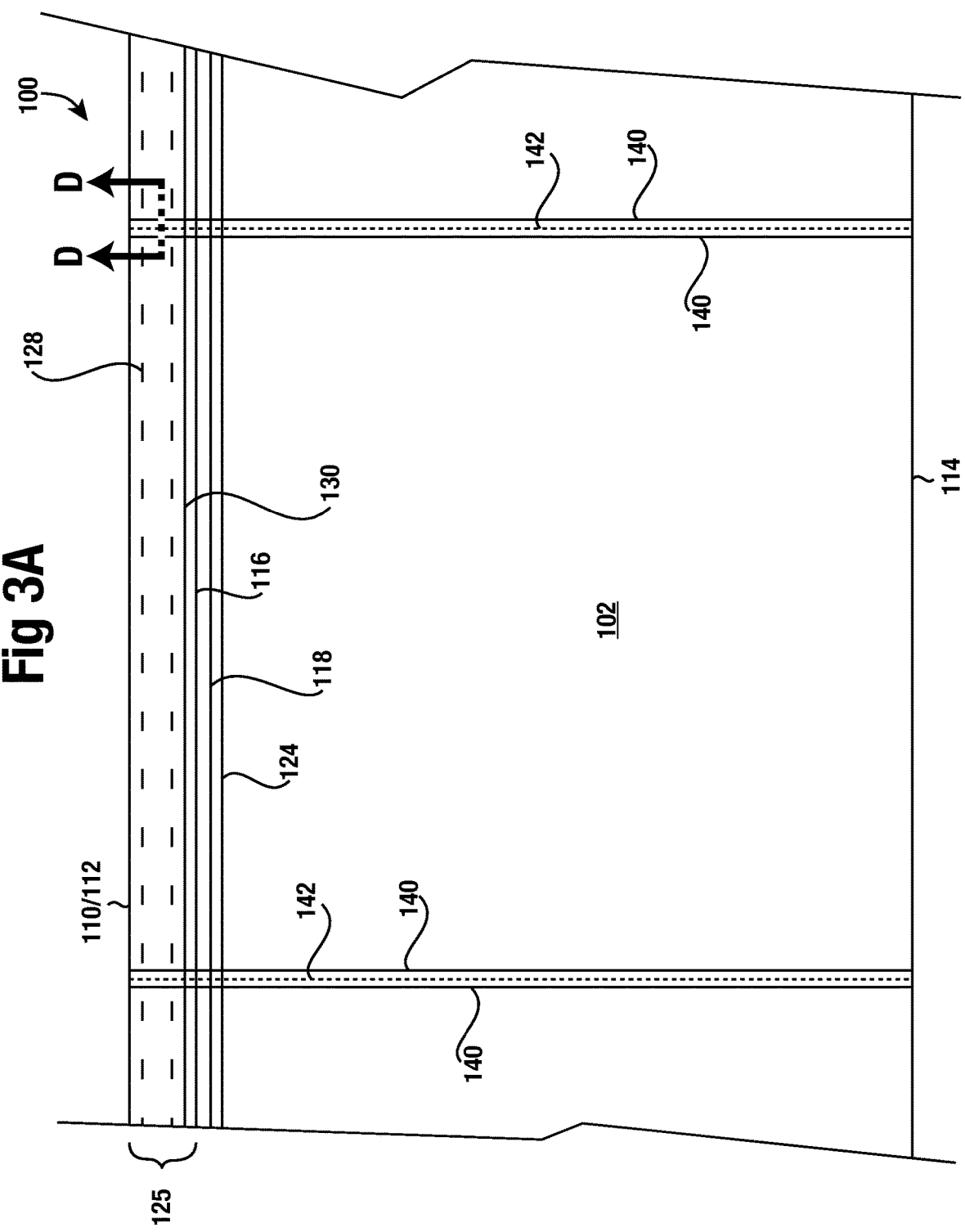

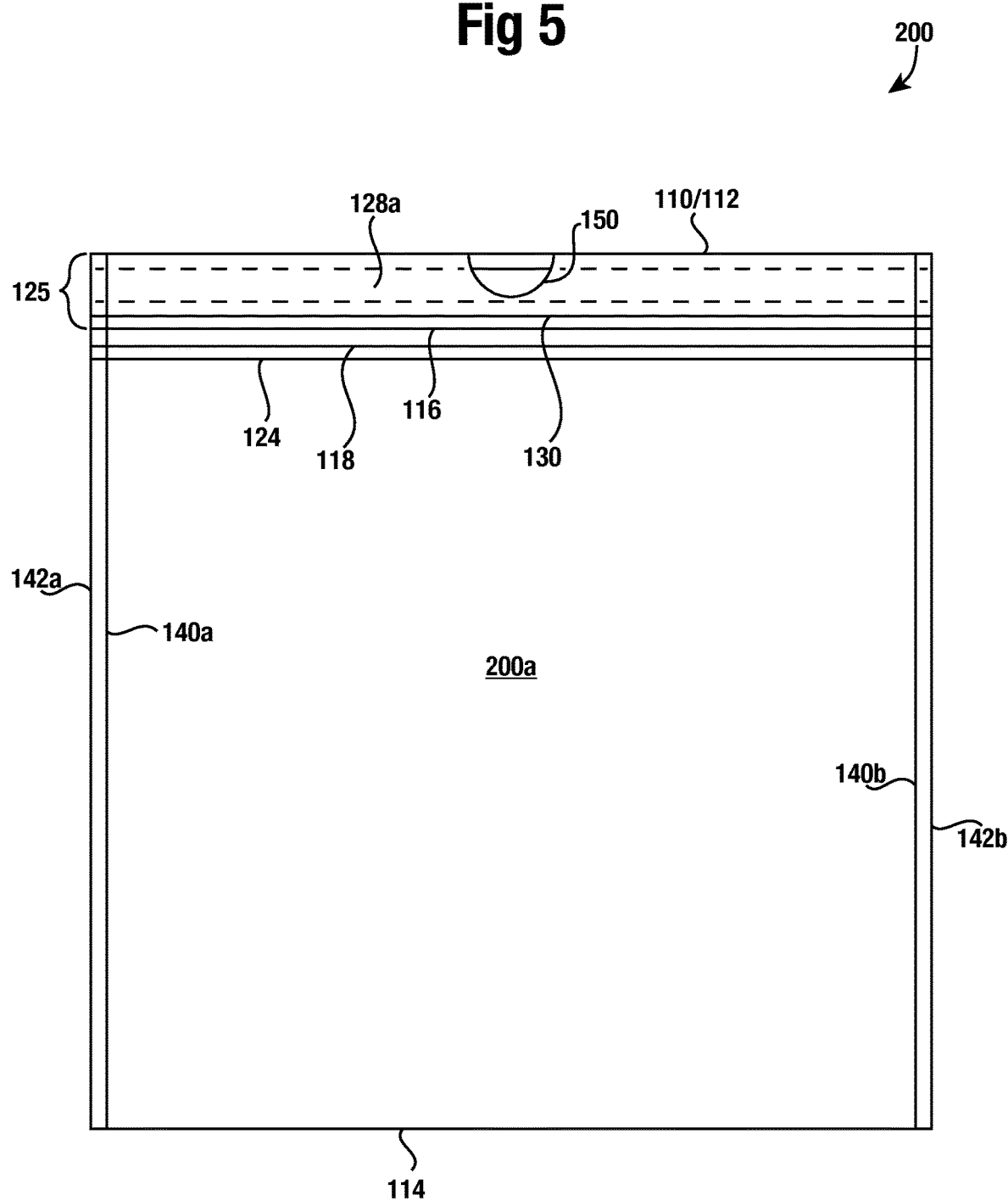

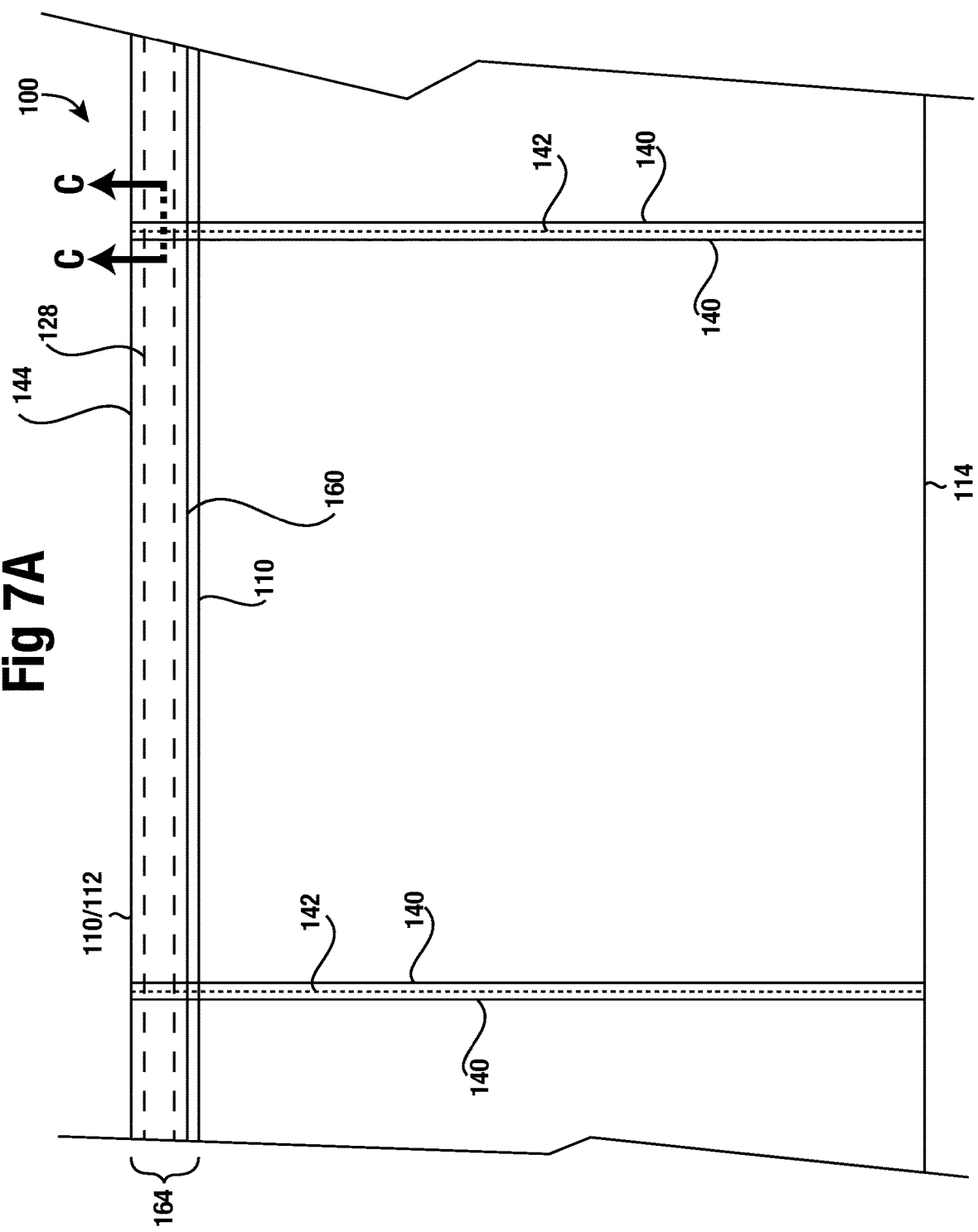

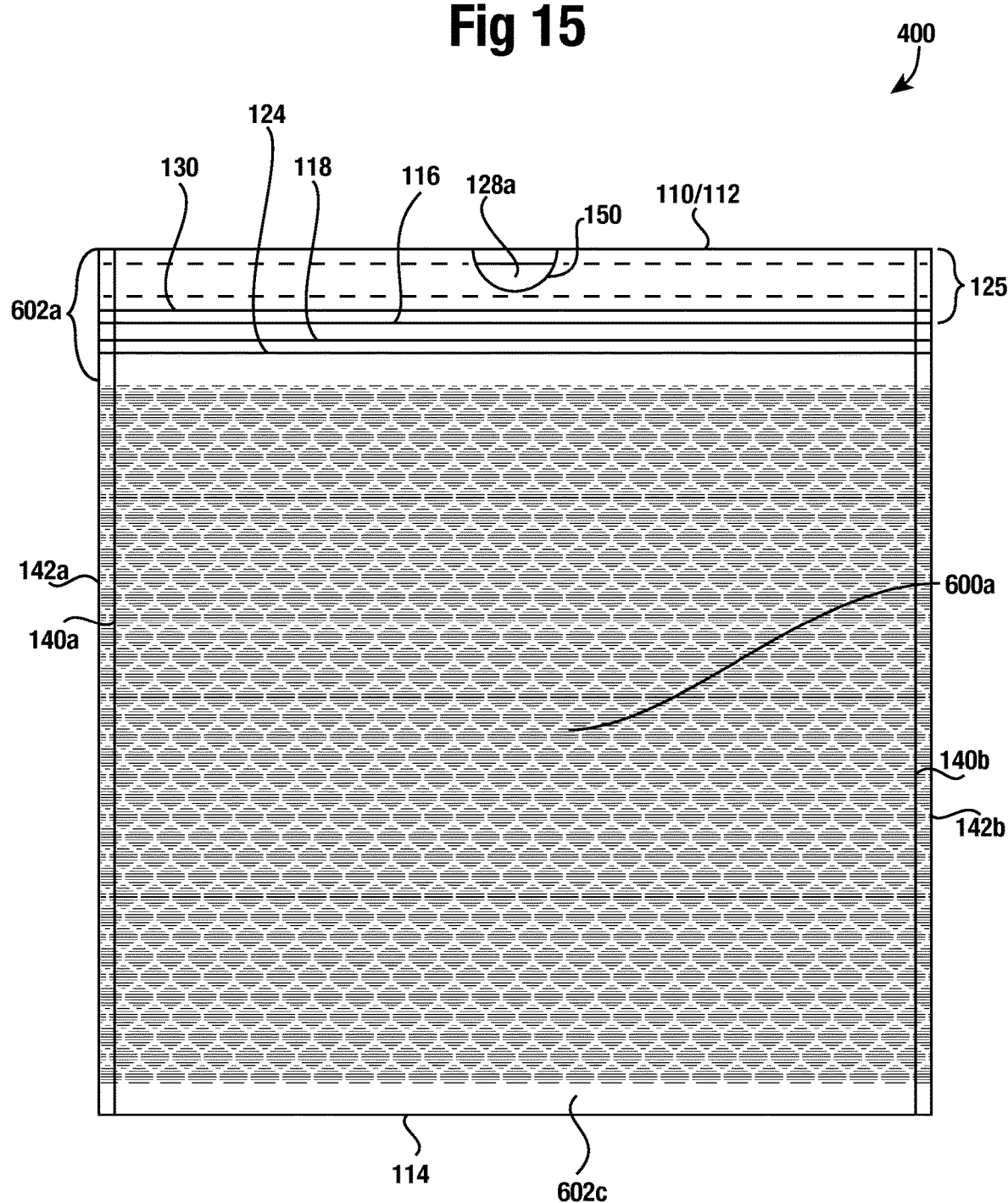

POLYMERIC BAGS AND METHOD TO MAKE SAME

CROSS-REFERENCE TO RELATED APPLICATIONS

This application is a continuation of pending application Ser. No. 17/016,533, filed on Sep. 10, 2020, which is a divisional of application Ser. No. 15/712,543, filed on Sep. 22, 2017. These two aforementioned applications are hereby incorporated by reference into this disclosure.

BACKGROUND OF THE INVENTION

1. Field of the Invention

The present invention relates to improvements in the construction and manufacture of polymeric bags. In particular, the present invention relates to improvements to trash bags.

2. Description of the Related Art

Polymeric bags are ubiquitous in modern society and are available in countless combinations of varying capacities, thicknesses, dimensions, and colors. The bags are available for numerous applications including typical consumer applications such as long-term storage, food storage, and trash collection. Like many other consumer products, increased demand and new technology have driven innovations in polymeric bags improving the utility and performance of such bags. The present invention is an innovation of particular relevance to polymeric bags used for trash collection.

Polymeric bags are manufactured from polymeric film produced using one of several manufacturing techniques well-known in the art. The two most common methods for manufacture of polymeric films are blown-film extrusion and cast-film extrusion. In blown-film extrusion the resulting film is tubular while cast-film extrusion produces a generally planar film. Manufacturing methods for the production of drawstring bags from a web of material are shown in numerous prior art references including, but not limited to, U.S. Pat. Nos. 3,196,757 and 4,624,654, which are hereby incorporated by reference. In blown film extrusion, the direction that the film is extruded is commonly referred to as the machine direction (MD) and the direction perpendicular to the machine direction is commonly referred to as the cross direction (CD).

Drawstring trash bags are frequently used in connection with rigid containers. When used with a rigid container, it is common to fold the upper opening of a drawstring trash bag over the upper rim of the container to keep the upper opening of the bag accessible. Some rigid containers provide retaining devices to hold the upper opening of a drawstring bag in place while, in other instances, the drawstring bag may provide certain features or properties that facilitate keeping the bag in place on the container. The use of these rigid containers is particularly common in connection with 13-gallon drawstring bags typically used in the household or in an office environment. Rigid containers may also be used with larger bags, such as those commonly used for the collection of outdoor or yard waste. When drawstring bags are used with supporting rigid containers, the drawstring trash bag is often filled with trash and other debris until the capacity of the container or trash bag is reached.

Use of polymeric film presents technical challenges since polymeric film is inherently soft and flexible. Specifically, all polymeric films are susceptible to puncture and tear propagation. In some instances, it may be possible to increase the thickness of the film or select improved polymers to enhance the physical properties of the film. However, these measures increase both the weight and cost of the polymeric film and may not be practicable. In light of the technical challenges of polymeric film, techniques and solutions have been developed to address the need for improved shock absorption to reduce the likelihood of puncture and also to increase the tear resistance of polymeric films.

U.S. Pat. No. 5,205,650, issued to Rasmussen and entitled Tubular Bag with Shock Absorber Band Tube for Making Such Bag, and Method for its Production, discloses using polymeric film material with stretchable zones wherein the film material has been stretched in a particular direction with adjacent un-stretched zones that extend in substantially the same direction. The combination of the stretched zones and adjacent un-stretched zones provides a shock absorber band intended to absorb energy when the bag is dropped. Specifically, when a bag is dropped or moved, the contents inside the bag exert additional forces that would otherwise puncture or penetrate the polymeric film. However, the shock absorber bands absorb some of the energy and may prevent puncture of the film.

Another example of a polymeric film material designed to resist puncture is disclosed in U.S. Pat. No. 5,518,801, issued to Chappell and entitled Web Materials Exhibiting Elastic-Like Behavior. Chappell, in the aforementioned patent and other related patents, discloses using a plurality of ribs to provide stretchable areas in the film much like Rasmussen. Chappell also discloses methods of manufacturing such polymeric film with such ribs.

Another example of shock absorption to prevent puncture is disclosed in U.S. Pat. No. 5,650,214 issued to Anderson and entitled Web Materials Exhibiting Elastic-Like Behavior and Soft Cloth-Like Texture. Anderson discloses using a plurality of embossed ribs defining diamond-shaped areas with a network of unembossed material between the diamond-shaped areas. Thus, the unembossed area comprises a network of straight, linear unembossed material extending in two perpendicular directions.

The foregoing disclosures specifically address the desire to increase the shock absorption of polymeric film to reduce the likelihood of punctures occurring in the film. However, none of the foregoing disclosures address the problem of reducing tear propagation in the polymeric film of a bag.

Previously known solutions to limiting tear propagation are based on two primary concepts. First, longer and more tortuous tear paths consume more energy as the tear propagates and can help in limiting the impact of the tear in a bag or polymeric film. Second, many polymeric films, particularly polymeric films made using a blown-film extrusion process, have different physical properties along different axes of the film. In particular, blown films are known to have higher tear strength in the cross-direction versus the corresponding tear strength in the machine direction. Certain prior art solutions take advantage of the differential properties of polymeric films by redirecting tears into a different direction. This redirecting of tears can offer greater resistance to a tear propagating. For example, some solutions redirect a tear propagating in the weaker machine direction of blown film into the stronger cross-direction.

One solution for reducing tear propagation is based on the idea that longer, tortuous tear paths are preferable and is described in U.S. Pat. No. 6,824,856, issued to Jones and entitled Protective Packaging Sheet. Jones discloses materials suitable for packaging heavy loads by providing an embossed packaging sheet with improved mechanical properties. Specifically, a protective packaging sheet is disclosed where surfaces of the sheet material are provided with protuberances disposed therein with gaps between protuberances. The protuberances are arranged such that straight lines necessarily intersect one or more of the protuberances. The resulting protective packaging sheet provides mechanical properties where tears propagating across the polymeric sheet are subject to a tortuous path. The tortuous path is longer, and more complex, than a straight-line tear, and a tear propagating along such a path would require markedly more energy for continued propagation across the film compared to a tear along a similar non-tortuous path in the same direction. Thus, due to the increased energy required for tear propagation, the tortuous path ultimately reduces the impact of any tears that do propagate across the film.

Another example of a tear resistant plastic film is disclosed in U.S. Pat. No. 8,357,440 to George M. Hall with a filing date of Jun. 29, 2007 and entitled Apparatus and Method for Enhanced Tear Resistance Plastic Sheets, which is herein incorporated by reference into this disclosure. Hall discloses an alternative tortuous path solution and further relies on the fact discussed above that certain polymer films, particularly polymeric films made in a blown-film extrusion process, are known to have a stronger resistance to tear in the cross direction when compared to the machine direction.

Hall discloses a solution that contemplates using preferably shaped embosses, particularly convex shaped embosses with a curved outer boundary, to provide maximum resistance to tear propagation. In most polymeric films, a tear will have a tendency to propagate along the path of least resistance or in the machine direction. Hall contemplates redirecting propagating tears in a tortuous path with the additional intent of redirecting the machine direction tears along the curved edges of the embossed regions and into a cross direction orientation. The redirected tears in the cross direction will be subject to additional resistance and, preferably, will propagate to a lesser degree than a tear propagating in the machine direction in an unembossed film.

U.S. Pat. No. 9,290,303 to Brad A. Cobler (Cobler patent) with a filing date of Oct. 24, 2013 and entitled Thermoplastic Films with Enhanced Resistance to Puncture and Tear, herein incorporated by reference into this disclosure, discloses use of an embossing pattern. This embossing pattern applied to polymeric film balances both properties of shock absorption and tortuous tear paths in the cross direction. The patent discloses that the embossing pattern comprises a plurality of embossed regions comprised of a plurality of parallel, linear embosses. The plurality of embossed regions is arranged so that a straight line cannot traverse the polymeric film without intersection at least one of the plurality of embossed regions.

Another method to improve the tear and puncture resistance of trash bags may be to construct the bag from multiple layers of polymeric film. Under certain conditions, two or more layers of film may provide improved tear and strength properties in comparison to a single layer of film with a comparable thickness. For instance, thinner layers of film formed by blown film extrusion can lead to increased MD orientation due to an increased draw down ratio. The increased MD orientation can result in increased MD tensile strength and thus increase the burst strength of bags formed from multiple layers of thin film versus a single layer of film of comparable thickness.

An increased draw down ratio is also known to improve CD tear strength due to the increased MD orientation as may be the result of extruding thinner layers of film. In contrast to this, the embossing pattern of the Cobler when applied to flex the film in the CD direction is known to improve MD tear strength and decrease CD tear strength. Thus, the use of multiple layers of thin film can work in tandem with the embossing pattern of the Cobler applied to the film layers. The increased CD tear strength of the thinner layers can offset the decrease in CD tear strength due to use of the Cobler embossing pattern.

In light of the foregoing, it would be desirable to provide a method of efficiently manufacturing bags comprised of panels having multiple layers. It would also be desirable to provide trash bags with multiple layers with the embossing pattern as disclosed by the Cobler patent. A bag with this pattern and multiple layers may provide a trash bag with improved shock absorption and resistance to tear propagation in comparison to the state of the art trash bags. The present invention addresses these objectives.

SUMMARY OF THE INVENTION

In at least one embodiment of the present invention, a method to form a bag of polymeric film is disclosed. To form the bag, a tube of polymeric film can be formed and the tube can have a machine direction. The tube can be collapsed to form a collapsed tube. The collapsed tube can comprise first and second layers and opposing first and second edges. Each of the layers can have first and second halves on opposing sides of a central axis of the collapsed tube. The collapsed tube can be folded such that the first edge is positioned adjacent to the second edge. The folding of the collapsed tube can define a third edge generally coextensive with a central axis of the collapsed tube. The first and second halves of the first layer and the first and second halves of the second layer can be sealed to each other by a plurality of seals. The collapsed tube can be formed into a plurality of bags. Each bag of the plurality of bags can comprise a front panel and a rear panel. The front panel can comprise the first half of the first and second layers. The rear panel can comprise the second half of the first and second layers.

In certain embodiments of the above-described method, the first half of the first layer can be slit to form two inner edges. One of the two inner edges can be positioned to expose an inner surface of the second layer. A first draw tape can be inserted between the first and second layers and adjacent to the two inner edges. One of the two inner edges can be positioned over the first draw tape. A first inner seal can be formed in the first and second layers adjacent to a first edge of the two inner edges. Additionally, a second inner seal in the first and second layers can be formed adjacent to the second edge of the two inner edges.

The above-described method may further include the two inner edges slit adjacent and parallel to the first edge. The first and second halves of the second layer can be positioned between the first and second halves of the first layer. The two inner edges can comprise upper and lower inner edges and the upper inner edge can be positioned between the lower inner edge and the first edge. The first inner seal can be positioned between the first edge and the upper inner edge. The first draw tape can be positioned between the first inner seal and the first edge.

In further embodiments of the above-described method, the first edge can be folded back towards the third edge to define a fourth edge and a first overlap section. A first hem can be defined between the first overlap section and the front panel. The second edge can be folded back towards the third edge to define a fifth edge and a second overlap section. A first hem can be defined between the first overlap section and the first layer and a second hem can be defined between the second overlap section and first layer. A draw tape can be inserted into the first hem and the second hem. The first overlap section can be sealed to the first layer with a first hem seal and the second overlap section can be sealed to the first layer with a second hem seal. Additionally, the first hem seal can seal the first and second layers of the front panel to the first and second layers of the overlap section. A plurality of closely spaced pairs of parallel seals can be formed in the tube extending in a cross direction. A perforation can be formed between and parallel to each pair of parallel seals. The tube can be separated at each perforation to form the plurality of bags.

In further embodiments of the method disclosed above, an embossed pattern can be embossed onto the collapsed tube. The collapsed tube can be embossed prior to the collapsed tube being folded. The embossed pattern can be applied to at least two partial widths of the collapsed tube and not applied to at least three partial widths of the collapsed tube.

In a further embodiment of the present invention, an additional method is disclosed to form a bag from a tube of blown polymeric film. The tube can have a machine direction. The tube can be collapsed to form a collapsed tube. The collapsed tube can have first and second layers and opposing first and second edges. The collapsed tube can further have first and second halves defined on opposite sides of a central axis of the collapsed tube. The collapsed tube can be folded to position the first edge adjacent to the second edge and to form a third edge about a central axis of the collapsed tube. The first half of the first layer can be slit to form two detached sections. One of the two detached sections can be positioned to expose an inner surface of the second layer. A first draw tape can be inserted between the first and second layers. One of the two detached sections can be positioned over the first draw tape. The two detached sections can be attached to the second layer. The first and second halves of the first layer and the first and second halves of the second layer can be sealed to each other by a first side seal and a second side seal. The collapsed tube can be separated into a plurality of bags.

In the above-discussed embodiment of the invention, the method can further include the first draw tape located between the first and second layers and adjacent to the two inner edges. The two detached sections can be attached to the second layer via a heat seal. The two detached sections can include two inner edges parallel to the first outer edge. A plurality of pairs of closely spaced parallel seals can be formed that extend in the cross direction. A perforation can be formed between and parallel to each pair of parallel seals. The collapsed tube can be separated at each perforation to form the plurality of bags.

In a further embodiment of the invention, a bag can be formed from a collapsed tube of polymeric film. The bag can have a front panel and rear panel. The front and rear panels can be joined adjacent to a first side edge by a first side seal and adjacent to an opposite second side edge by a second side seal. The front panel and the rear panel can be joined at a bottom edge. The bottom edge can be formed by folding the collapsed tube such that the bottom edge is generally coextensive with a central axis of the collapsed tube. An opening of the bag can be defined by an upper edge of the front and rear panels. The upper edge can be defined by opposing first and second edges of the collapsed tube.

In the above-discussed embodiment of the invention, the front panel can further include first and second layers. The first and second layers can extend from the upper edge to the bottom edge. A first drawstring can be between the first and second layers of the front panel and extend generally from the first side seal to the second side seal. The first and second inner edges can be defined in the first layer of the front panel and below the upper edge. The first inner edge can be above the second inner edge. A first inner seal can be above the first inner edge and below the upper edge. A second inner seal can be below the second inner edge. The first drawstring can be between the upper edge and the first inner seal. The first side seal can seal together the first and second layers of the front panel, the first drawstring, first and second layers of an overlap section of the front panel, first and second layers of the rear panel, a second drawstring, and first and second layers of the overlap section of the rear panel.

BRIEF DESCRIPTION OF THE RELATED DRAWINGS

A full and complete understanding of the present invention may be obtained by reference to the detailed description of the present invention and certain embodiments when viewed with reference to the accompanying drawings. The drawings can be briefly described as follows.

FIG. 1 provides a top view of a collapsed tube of a first embodiment of the present invention.

FIGS. 2A-2E provide cross-sectional views of the collapsed tube according to the first embodiment of the present invention.

Figure 2B:
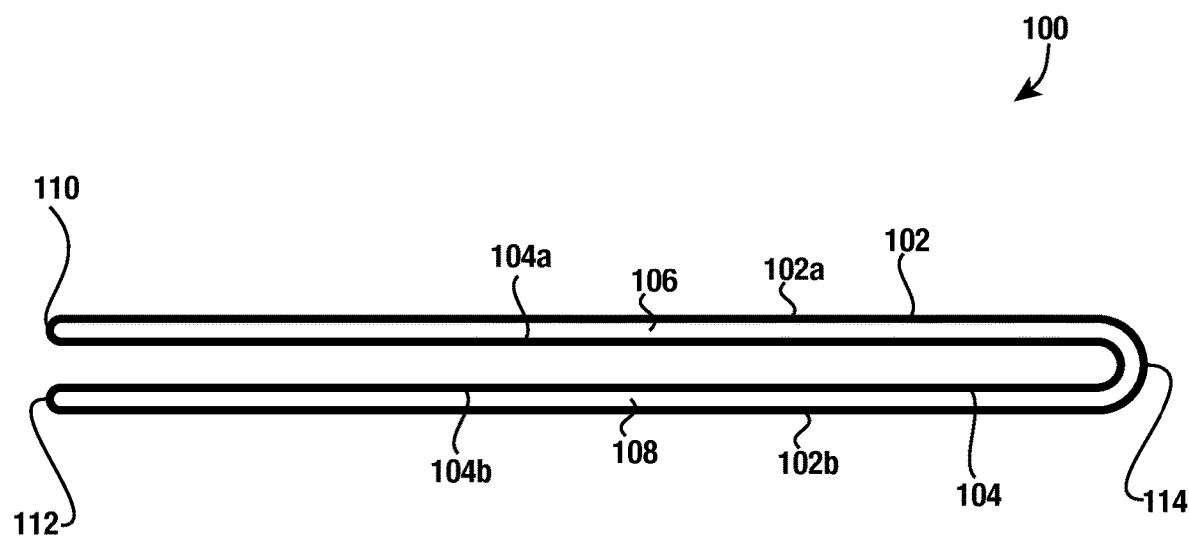
Figure 2C:
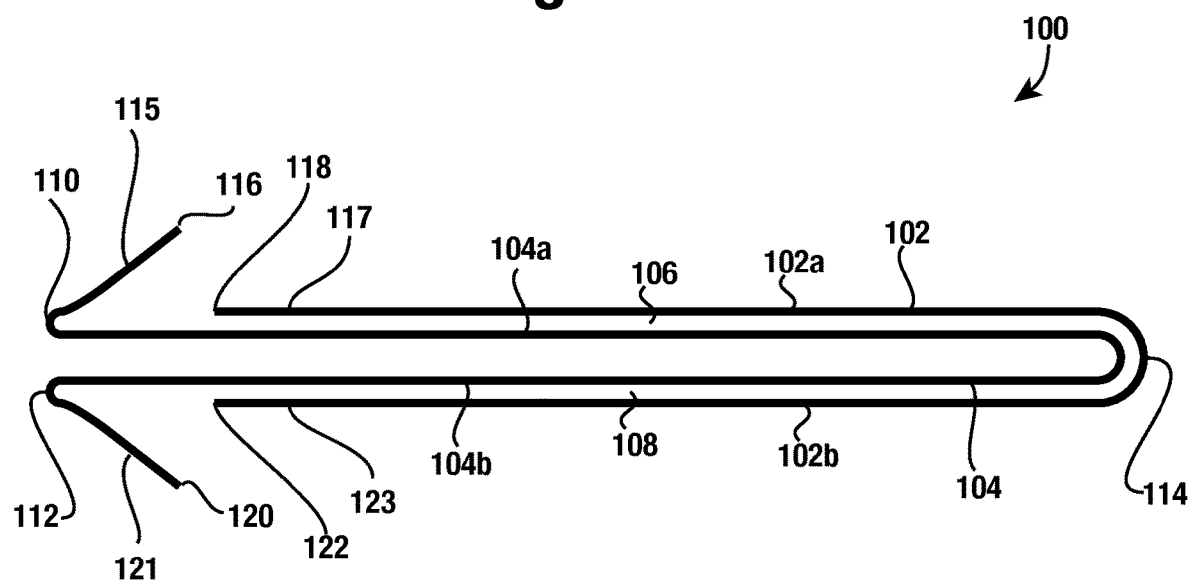
Figure 2D:
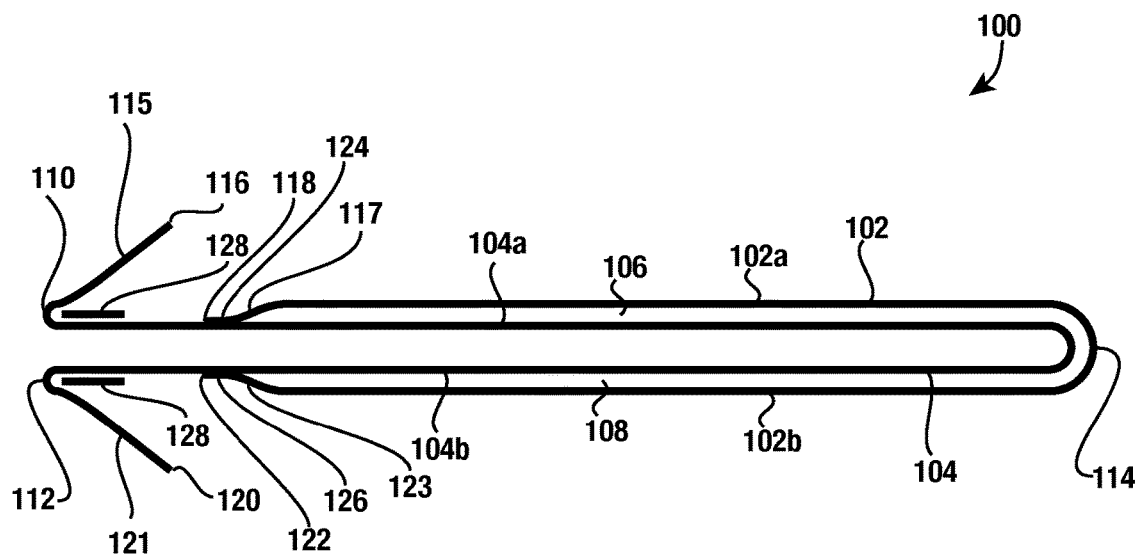
Figure 2E:
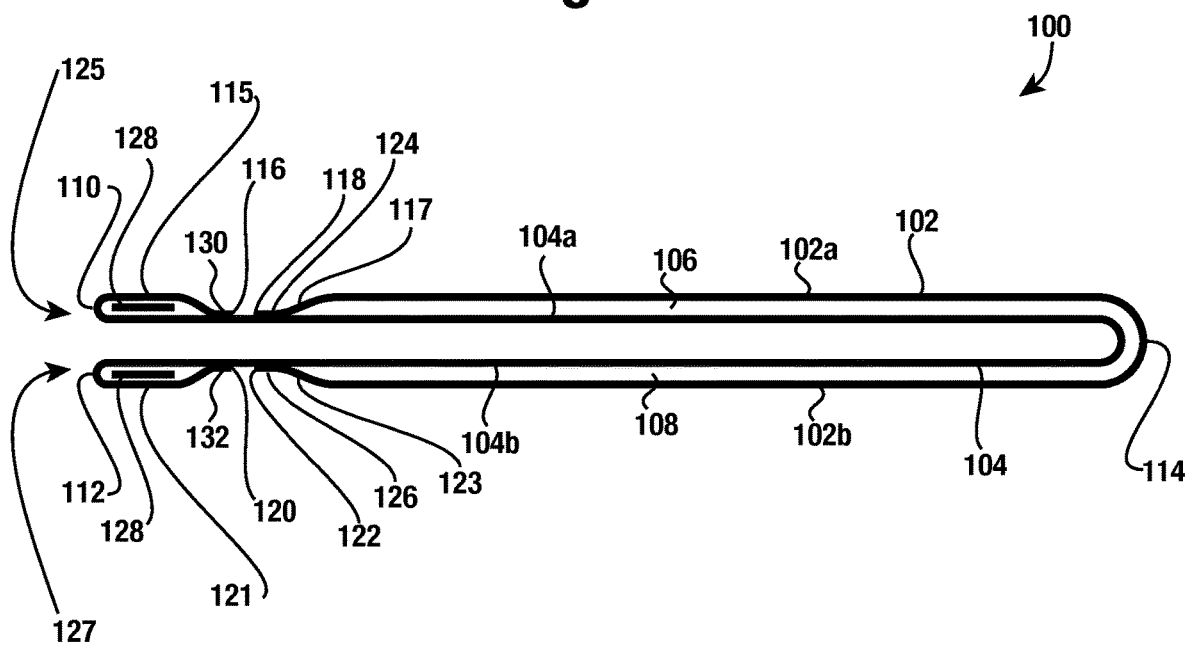
Figure 2F:
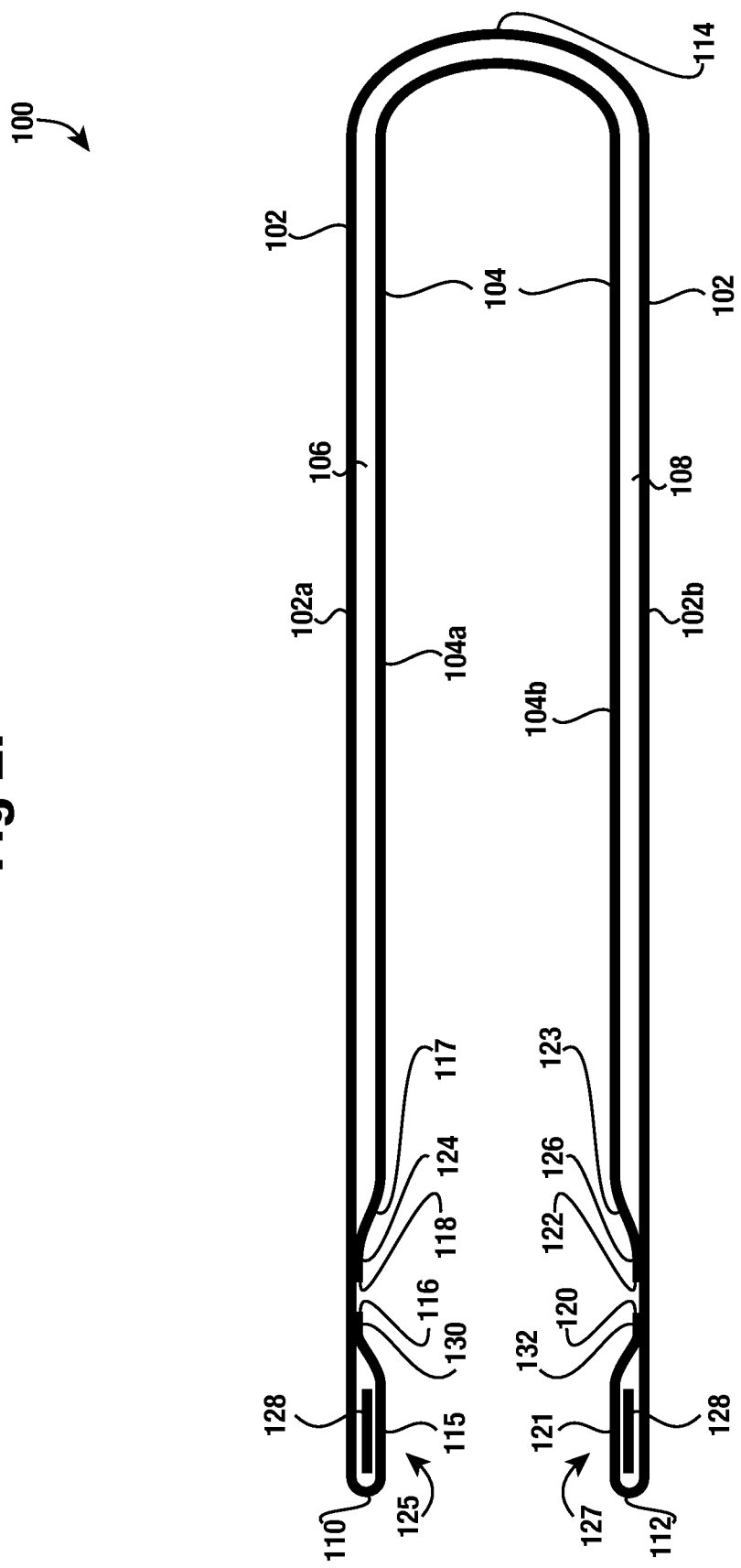

FIG. 2F provides a cross-section view of the collapsed tube according to a second embodiment of the present invention.

FIG. 3A provides a top view of the collapsed tube of FIG. 2E.

Figure 3B:
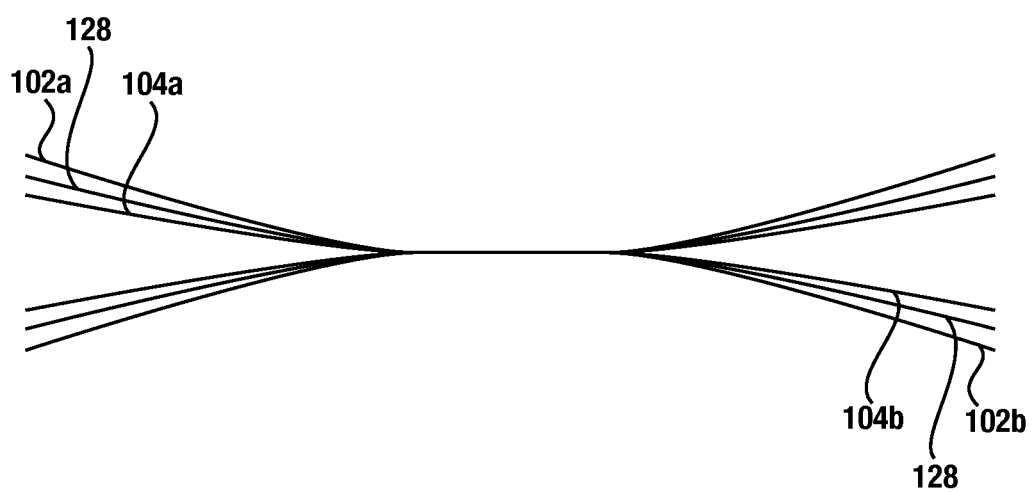

FIG. 3B provides a partial cross-sectional schematic view of the collapsed tube of FIG. 3B taken from partial cutting plane D-D.

Figure 4:
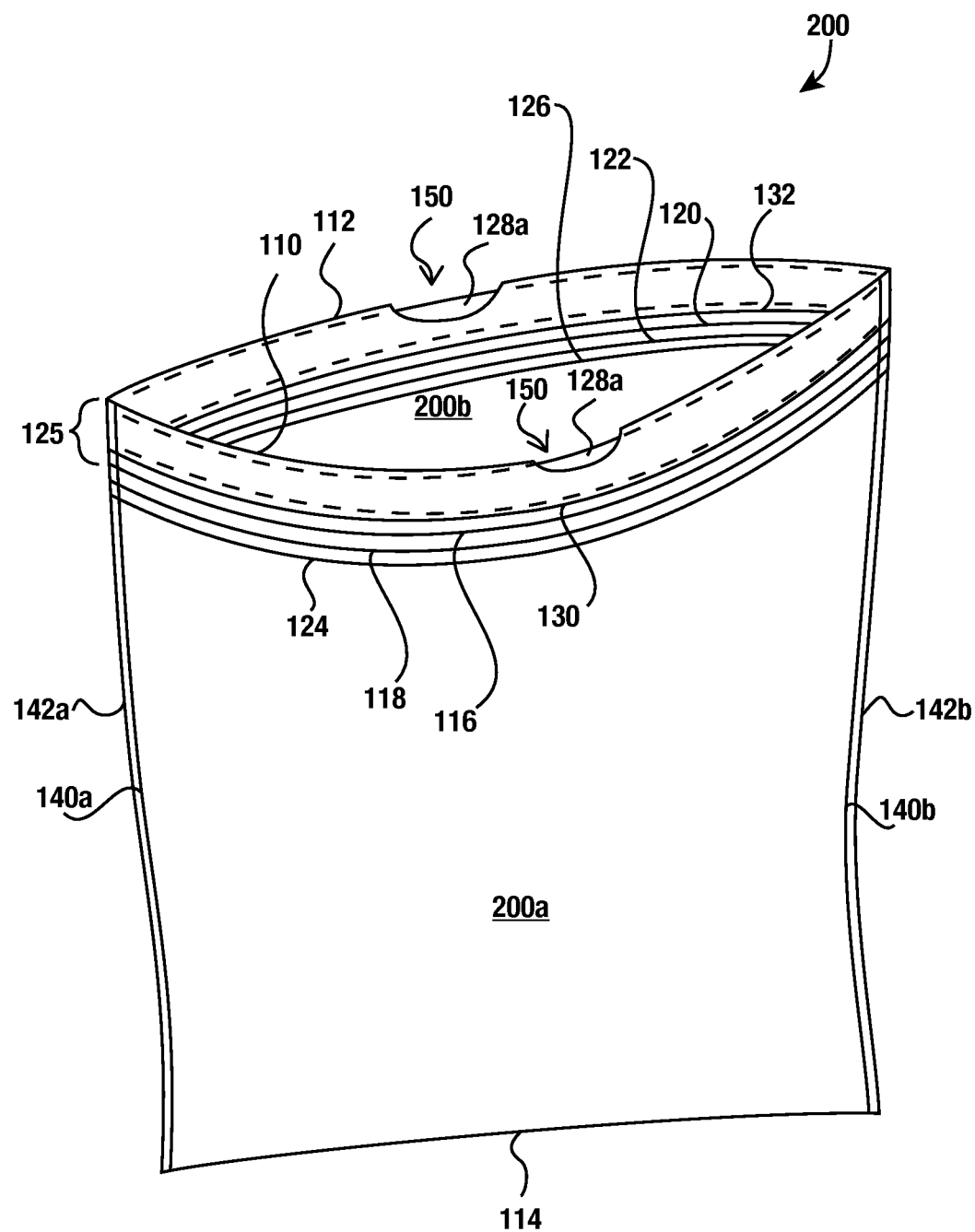

FIG. 4 provides a perspective view of a bag according to the first embodiment of the present invention.

FIG. 5 provides a front view of the bag of FIG. 4.

Figure 6A:
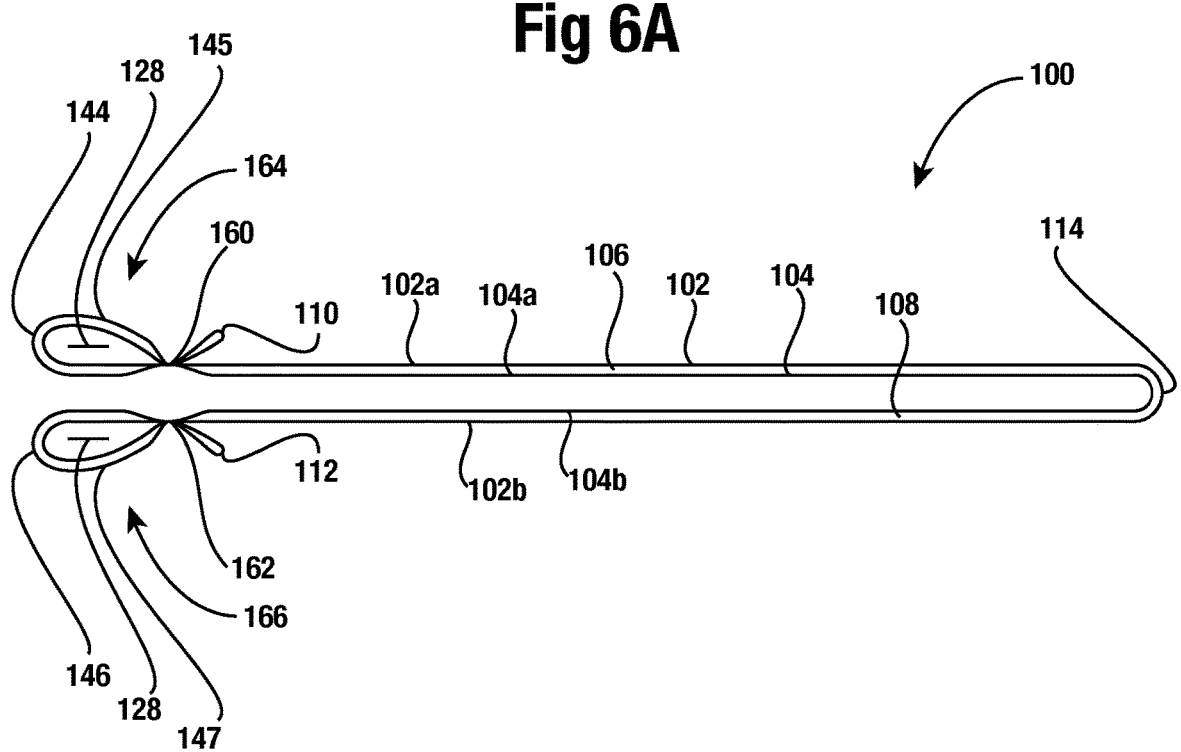

FIG. 6A provides a cross-sectional view of the collapsed tube according to a third embodiment of the present invention.

Figure 6B:
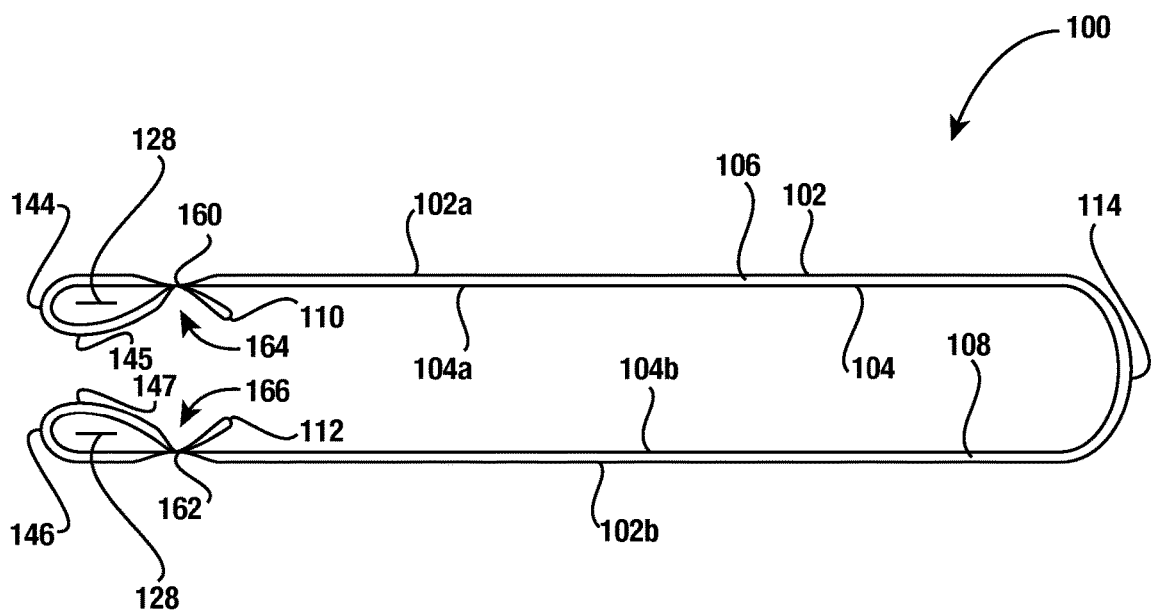

FIG. 6B provides a cross-sectional view of the collapsed tube according to a fourth embodiment of the present invention.

FIG. 7A provides a top view of the collapsed tube of FIG. 6A.

Figure 7B:
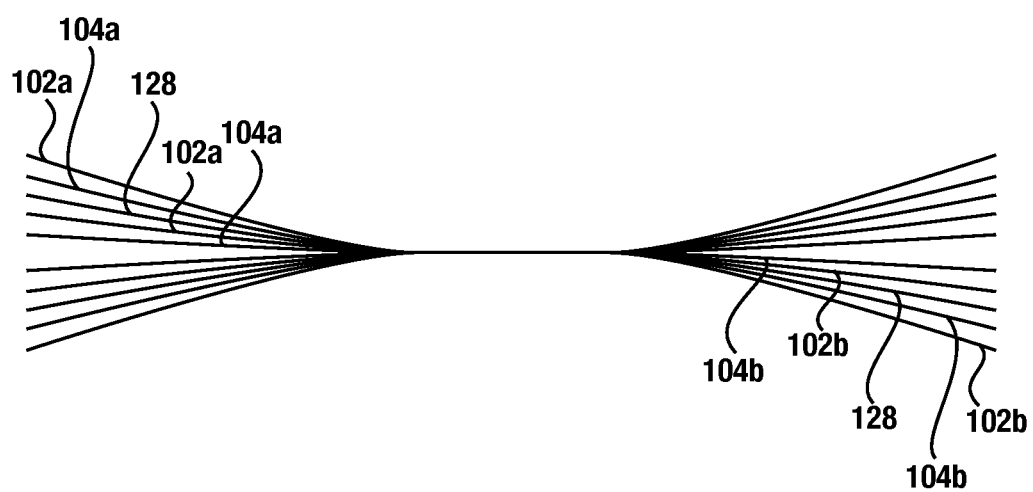

FIG. 7B provides a partial cross-sectional schematic view of FIG. 7A along the partial cutting plane of C-C.

Figure 8:
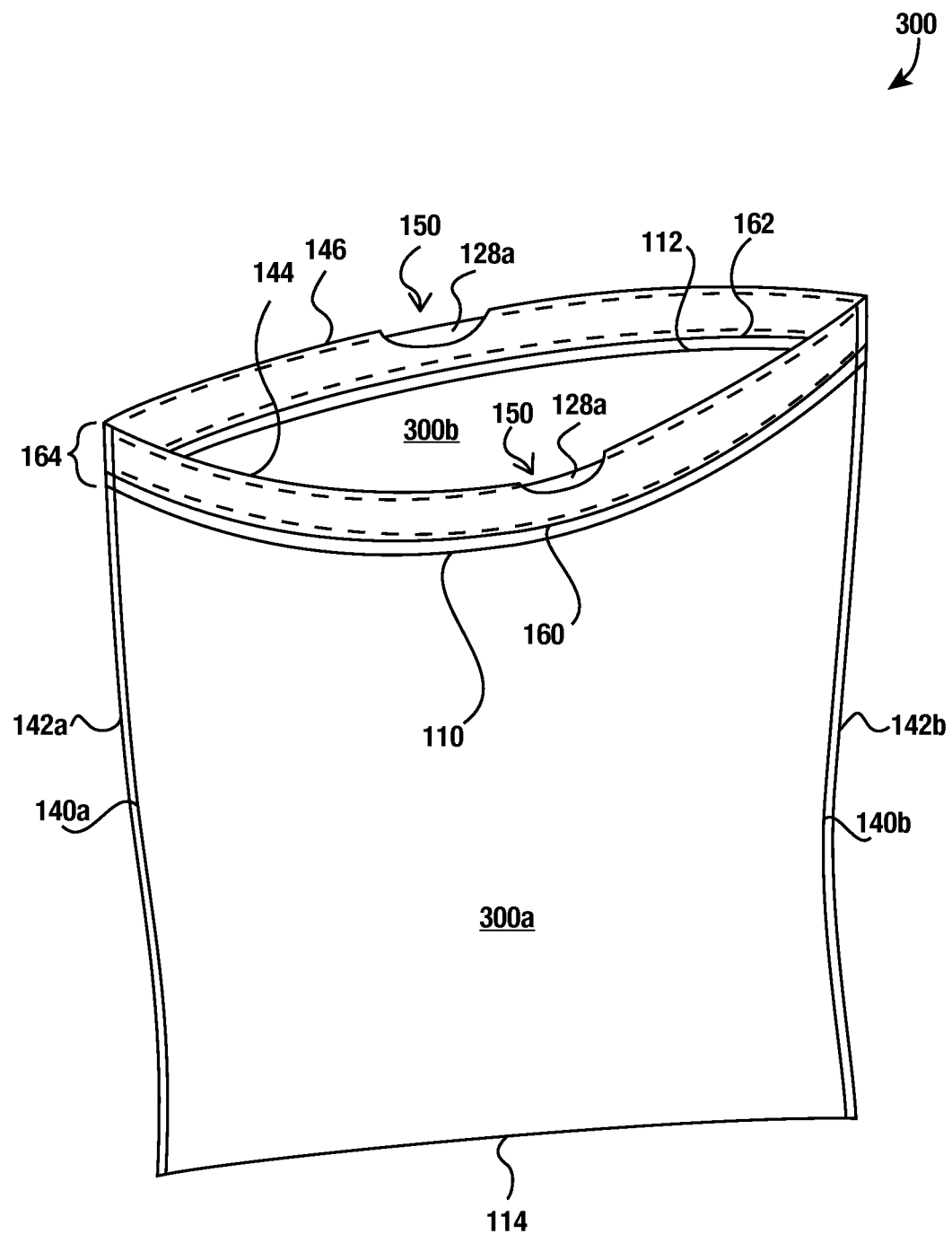

FIG. 8 provides a perspective view of a bag according to the third embodiment of the present invention.

Figure 9:
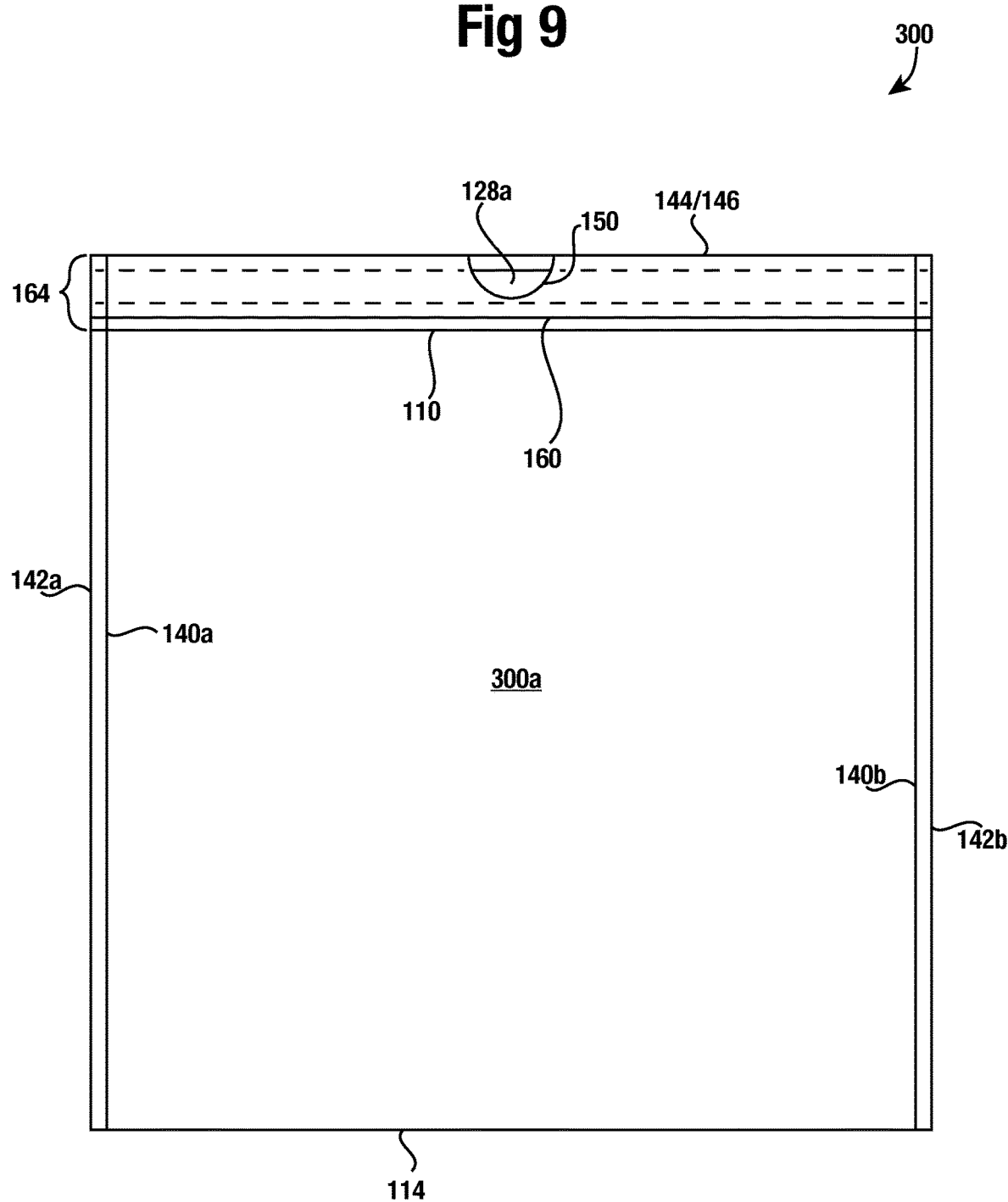

FIG. 9 provides a front view of the bag of FIG. 8.

Figure 10:
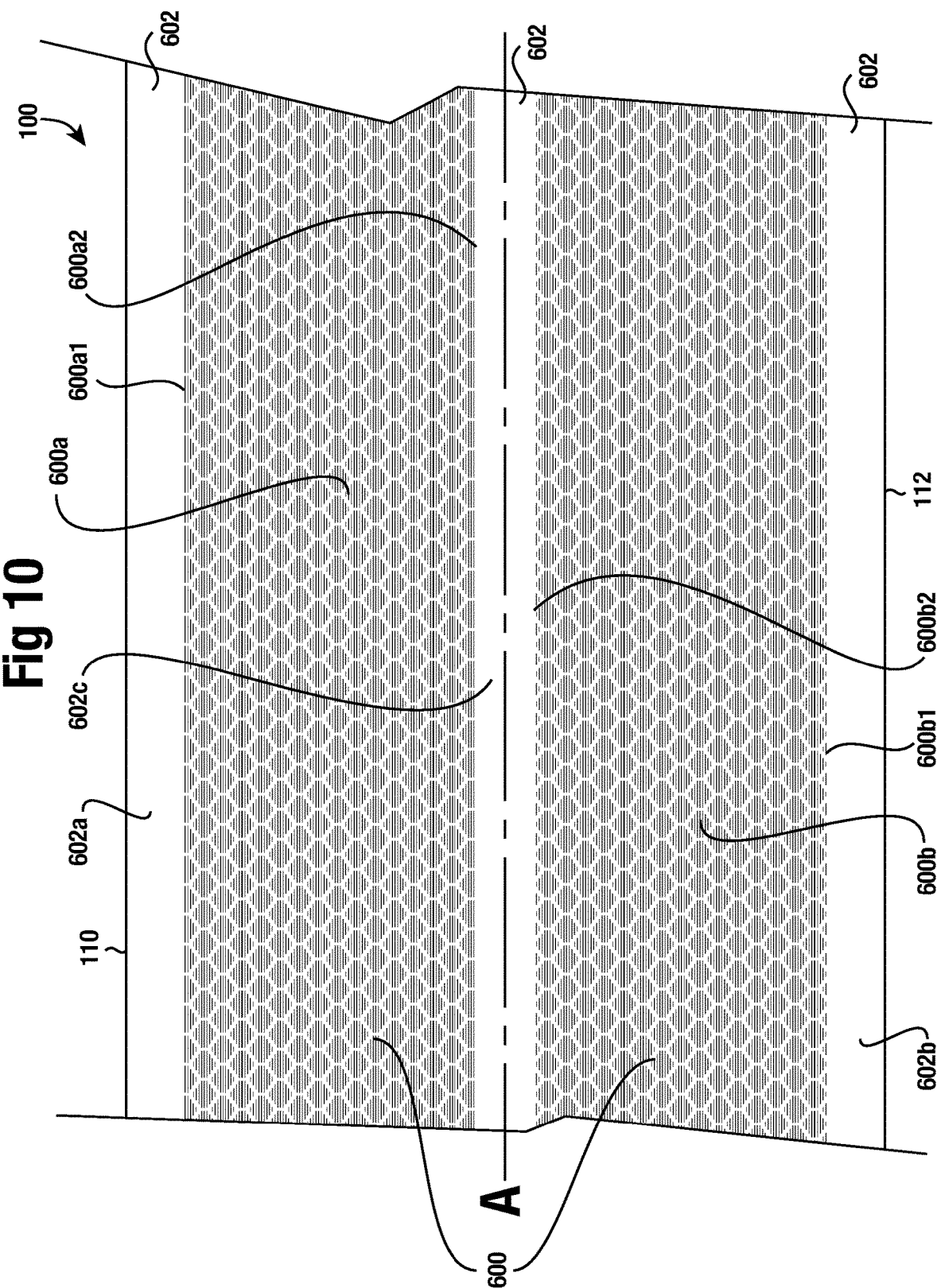

FIG. 10 provides a top view of a collapsed tube according to a fifth embodiment of the present invention.

Figure 11:
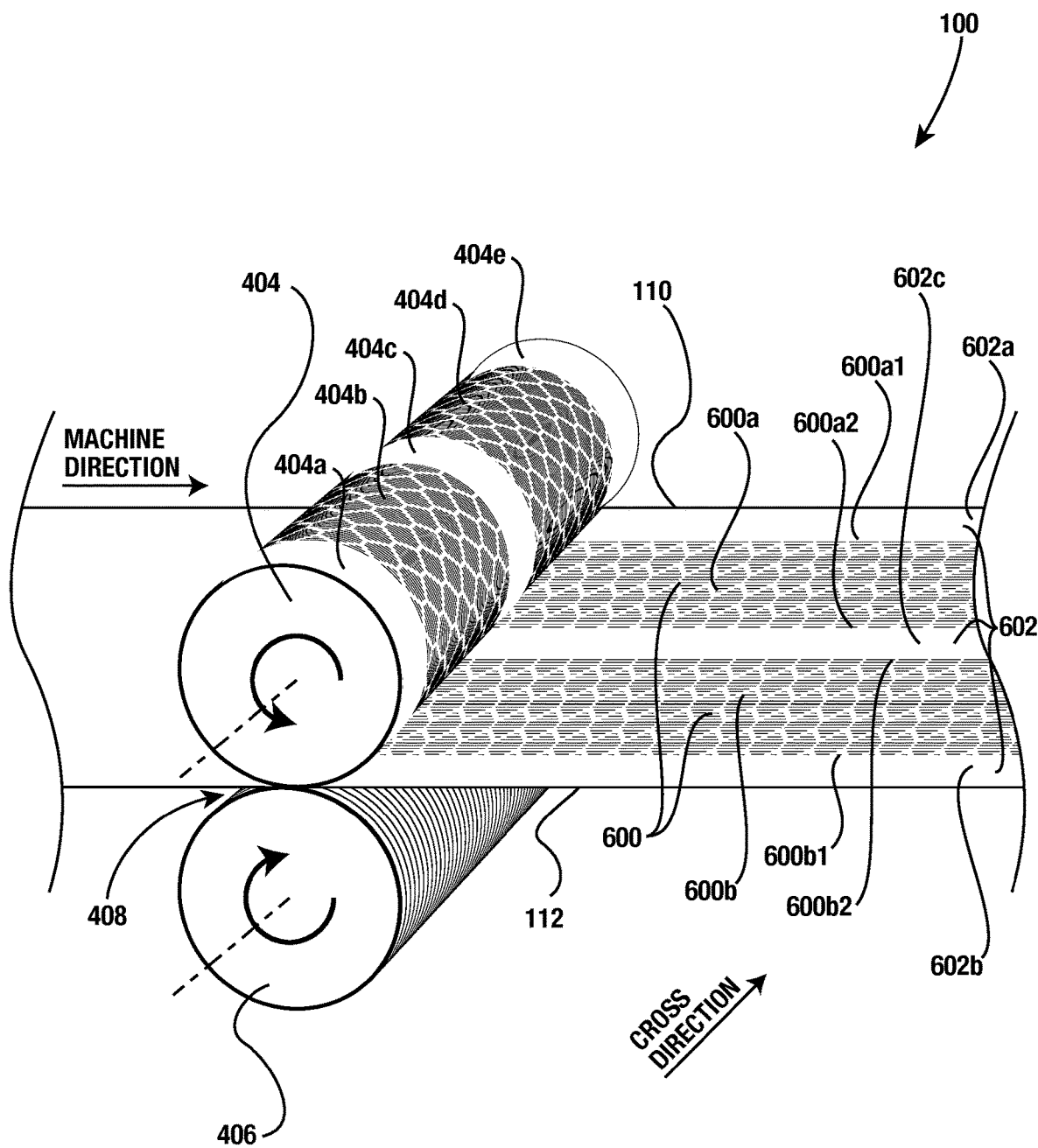

FIG. 11 provides a perspective view according to the fifth embodiment of the present invention.

Figure 12:
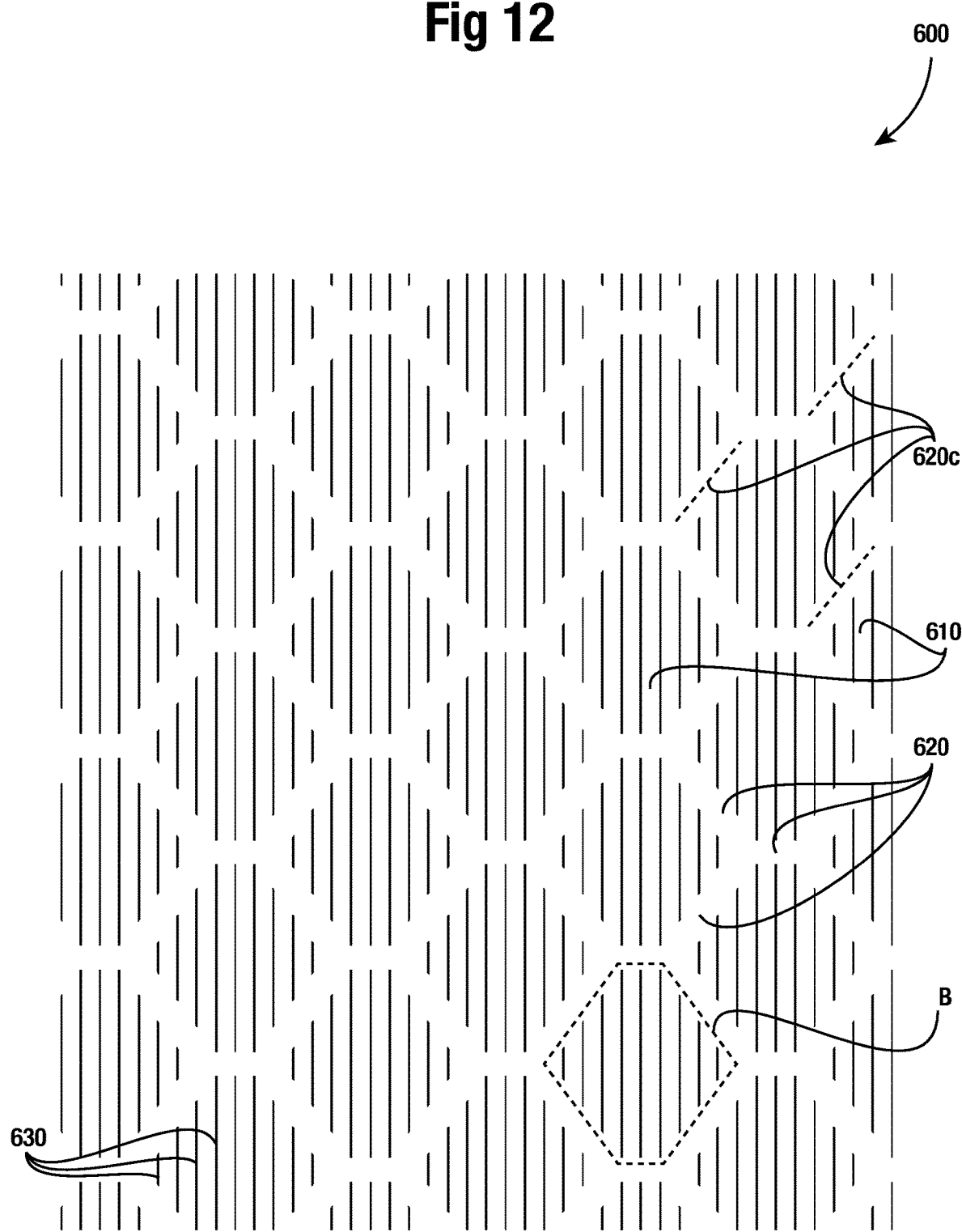

FIG. 12 provides a top schematic view of an embossing pattern according to the fifth embodiment of the present invention.

Figure 13:
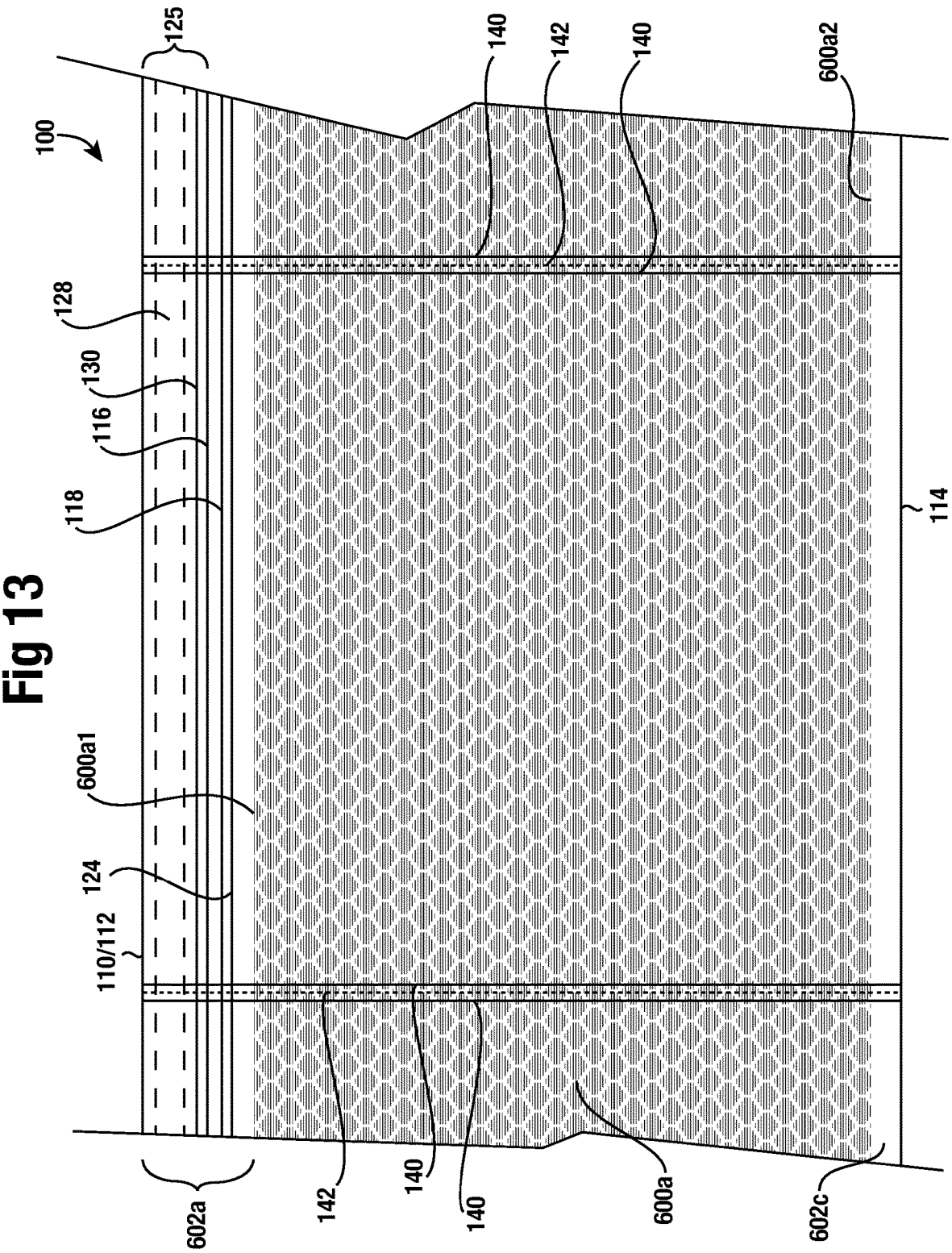

FIG. 13 provides an additional top view of the collapsed tube illustrating further the fifth embodiment of the present invention.

Figure 14:
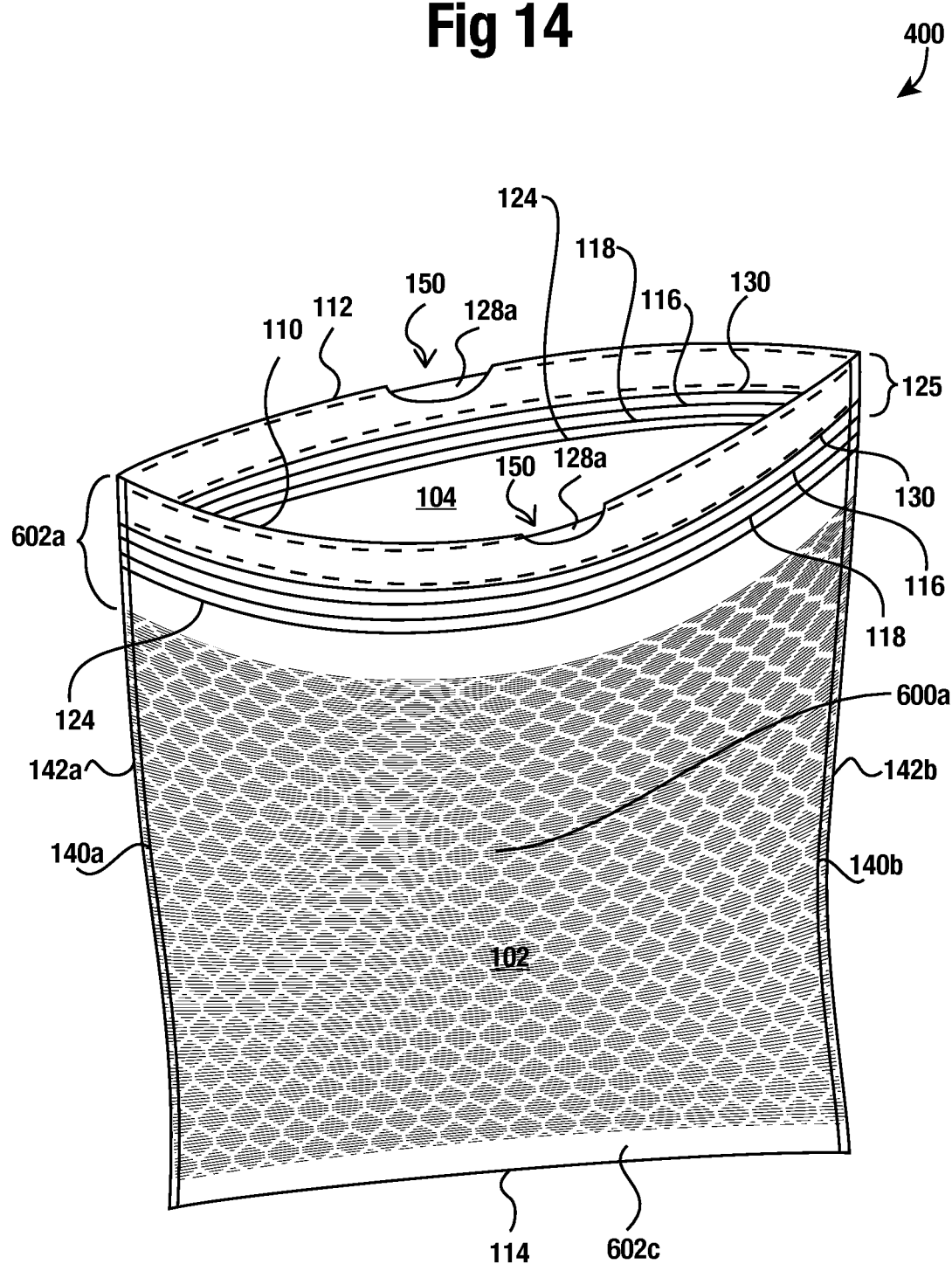

FIG. 14 provides a perspective view of the bag according to the fifth embodiment of the present invention.

FIG. 15 provides a side view of the bag of FIG. 14.

DETAILED DESCRIPTION OF THE INVENTION

The present disclosure illustrates several embodiments of the present invention. It is not intended to provide an illustration or encompass all embodiments contemplated by the present invention. In view of the disclosure of the present invention contained herein, a person having ordinary skill in the art will recognize that innumerable modifications and insubstantial changes may be incorporated or otherwise included within the present invention without diverging from the spirit of the invention. Therefore, it is understood that the present invention is not limited to those embodiments disclosed herein. The appended claims are intended to more fully and accurately encompass the invention to the fullest extent possible, but it is fully appreciated that certain limitations on the use of particular terms are not intended to conclusively limit the scope of protection.

FIG. 1 shows a top view of a flattened or collapsed tube 100 of blown polymeric film formed by a blown film extrusion process. FIG. 1 further shows the tube having a machine direction (MD) in the direction that tube 100 is extruded and a cross direction (CD) perpendicular to the machine direction. FIG. 1 shows the flattened tube 100 with a first edge 110 on a first side of tube 100 and an opposing edge 112 on a second side of tube 100. Central axis A of tube 100 is shown extending in the machine direction of tube 100. FIG. 1 further shows first and second halves 106 and 108 of tube 100 on opposing sides of central axis A.

In certain embodiments of the present invention, tube 100 may be comprised of a polymer blend, the polymer blend generally having linear low density polyethylene (LLDPE) as the primary component, but other polymers may be utilized including, but not limited to, other polyethylene polymers such as high density polyethylene (HDPE) or low density polyethylene (LDPE). Typically, the primary component of the polymer blend, such as linear low density polyethylene (LLDPE), will comprise at least 75% of the polymer blend. The remaining portion of the polymer blend may include additives including, but not limited to, coloring additives, anti-blocking agents, and/or odor control additives.

FIGS. 2A-2E illustrate various steps of a method of forming tube 100 into a multilayer bag. Typically, tube 100 shown in FIGS. 2A-2E would be completely flat with the first and second layers generally having little or no space between the two layers. However, first and second layers 102 and 104 are shown with a certain amount of separation for ease of illustration. Also for ease of illustration, the thickness of the polymeric film of tube 100 is illustrated with a single line throughout this disclosure.

FIG. 2A shows tube 100 in a generally flattened configuration. FIG. 2A further shows tube 100 having a first layer 102 and a second layer 104. Tube 100 is further shown in FIGS. 1 and 2A with a first half 106 and a second half 108. The first half 106 encompasses half of the first and second layers and the second half 108 encompasses half of the first and second layers of tube 100.

Once tube 100 is formed and collapsed as shown in FIG. 2A, collapsed tube 100 can be folded in half as illustrated in FIG. 2B. For ease of illustration, FIGS. 2B-2E are not in proportion with FIG. 2A. For instance, the overall width of tube 100 shown in FIGS. 2B-2E would be one-half the overall width of tube 100 shown in FIG. 2A if proportionality was maintained.

As shown in FIG. 2B, with collapsed tube 100 folded in half, first and second edges 110 and 112 are positioned adjacent to each other. Furthermore, a third edge 114 is defined in tube 100 opposite from edges 110 and 112. With tube 100 folded in half, third edge 114 is coextensive with central axis A of tube 100 of FIG. 1. Due to the folding, first half 106 of tube 100 is shown located above and adjacent to second half 108 of tube 100 such that first and second halves 104a and 104b of second layer 104 are proximate to each other and in between first and second halves 102a and 102b of first layer 102.

As shown by FIG. 2C, first layer 102 can be slit or severed in the first half 102a adjacent to the first edge 110 and in the machine direction. Second half 102b can also be slit adjacent to the second edge 112 with the slit extending in the machine direction. The slits in the first and second halves 102a and 102b can form first and second inner edges 116 and 118 in the first half 102a and third and fourth inner edges 120 and 122 in the second half 102b of the first layer 102. The inner edges 116, 118, 120, and 122 can extend in the machine direction and be parallel with first and second edges 110 and 112 as shown by FIG. 3A.

As further shown by FIG. 2C, first and second detached sections 115 and 117 in the first half 102a of tube 100 and third and fourth detached sections 121 and 123 in the second half 102b of tube 100 can be defined by the slitting operation. Once the two layers are slit, first and third edges 116 and 120, along with first and third detached sections 115 and 121, can be positioned away from the second layer 104 by rotating or folding first and third detached sections 115 and 121 away from second and fourth inner edges 118 and 122.

As shown by FIG. 2D, once first and third detached sections 115 and 121 are moved, draw tape 128 can then be inserted between first and second layers 102 and 104. FIG. 2D further shows first and second inner seals 124 and 126 sealing second detached section 117 to second layer 104 and fourth detached section 123 to second layer 104. Second inner seal 124 is shown proximate to second inner edge 118 and fourth inner seal 126 is shown proximate to fourth inner edge 122. Seals 124 and 126 may be formed before or after draw tape 128 is inserted. In at least certain embodiments of the invention, seals 124 and 126, and any other subsequently discussed seals, may be formed by heat-sealing the layers of polymeric film; however, other methods may be used to form the seals of the disclosure, such as pressure sensitive adhesive.

In certain embodiments of the present invention, draw tape 128 may be constructed from the same film as tube 100. However, in other embodiments, the material of draw tape 128 may differ from the material used for tube 100. For instance, draw tape 128 may be constructed from a polymeric film comprising a blend of LLDPE and LDPE. In further embodiments of the present invention, the draw tape may be constructed from film comprising HDPE or a blend of HPDE with one or both of LLDPE and LDPE. Other polymers may also be utilized in the construction of draw tape 128, such as polypropylene. As with the film of tube 100, the draw tape film may include additives such as coloring additives, anti-blocking agents, and/or odor control additives.

As shown by FIG. 2E, once draw tape 128 is inserted between layers 102 and 104, first and third detached sections 115 and 121 can be folded or rotated towards second layer 104 and sealed to second layer 104 by third and fourth inner seals 130 and 132. Third and fourth inner seals 130 and 132 can be located adjacent to first and third inner edges 116 and 120. As further shown by FIG. 2E, a first hem 125 can be defined by detached section 115, first half 104a of second layer 104 and third inner seal 130. Additionally, a second hem 127 can be defined by detached section 121, second half 104b of second section 104, and fourth inner seal 132.

In certain embodiments of the present invention, tube 100 may be slit at least two inches away from first and second edges 110 and 112 to construct first and second hems 125 and 127 with a width of at least two inches. Thus, a typical draw tape 128 with a width of generally one inch may be accommodated in two hems 125 and 127.

FIG. 2F illustrates a further embodiment of the invention, which is shown not to scale in comparison to FIG. 2E for purposes of illustration. The embodiment of FIG. 2F is similar to the embodiment illustrated by FIGS. 2C-2E; however, rather than slits placed in first layer 102, slits are placed in the FIG. 2F embodiment in first and second halves 104*a* and 104*b* of second layer 104. This modification results in first and second detached sections 115 and 117 and first and second inner ends 116 and 118 defined in first half 104*a* of inner second layer 104. This location of the slitting operation further results in third and fourth detached sections 121 and 123 and first and second inner ends 120 and 122 defined in second half 104*b* of inner second layer 104. Thus, detached sections 115, 117, 121, and 123 are sealed to outer first layer 102, rather than inner second layer 104, by inner seals 124, 126, 130, and 132 as previously described for FIG. 2E.

FIG. 3A shows a top view of collapsed tube 100 of FIG. 2E, which illustrates additional steps for converting tube 100 into a plurality of bags. For instance, FIG. 3A shows a plurality of pairs of closely spaced seals 140 formed in tube 100 with seals 140 extending in the cross direction of tube 100. As shown by FIG. 3A, the two seals of each pair of seals 140 are closely spaced in relation to each other. In between each pair of closely spaced seals 140 is shown a perforation 142 extending in the cross direction from the first and second edges 110 and 112 to the third edge 114. Each seal of the pair of closely spaced seals 140 forms a side seal for a bag formed from tube 100. Each perforation 142 may be severed to define one of two side edges of an individual bag.

Each seal 140 seals together first halves 102*a* and 104*a* of the first and second layers 102 and 104 to second halves 102*b* and 104*b* of first and second layers 102 and 104 to seal together four layers of tube 100. Furthermore, as shown by FIG. 3B, a schematic partial cross-sectional view of FIG. 3A, six layers of film are sealed together by each seal 140 when the film of draw tape 128 is taken into account. FIG. 3B shows that each seal 140 seals together first layer of first half 102*a*, draw tape 128 within first half 106, second layer of first half 104*a*, draw tape 128 within second half 108, and first layer 102*b* of the second half.

Now returning to FIG. 3A, first inner edge 116 is shown above the second inner edge 118 and the first inner edge 116 is shown between the second inner edge 118 and first edge 110. Draw tape 128 is shown between the first edge 110 and the first inner edge 116. Third inner seal 130 is shown between first edge 110 and first inner edge 116 and first inner seal 124 is shown below second inner edge 118.

Now turning to FIGS. 4 and 5, an individual bag 200 is shown. Bag 200 can be formed from tube 100 according to the method illustrated by FIGS. 2A-2E and 3. FIG. 4 shows a front panel 200*a* and a rear panel 200*b* of bag 200 while FIG. 5 shows only front panel 200*a*. Further shown in FIGS. 4 and 5 are opposing side edges 142*a* and 142*b* of bag 200 formed from perforations 142 as shown in FIG. 3A. First and second edges 110 and 112 of tube 100 form the top edges of bag 200 while third edge 114 forms a bottom edge of bag 200. Seals 140 of FIG. 3A form opposing first and second side seals 140*a* and 140*b* in bag 200. Seals 124 and 130 of FIG. 3A define lower and upper hem seams in front panel 200*a* and seals 126 and 132 define lower and upper hem seams in rear panel 200*b*. Draw tape 128, once severed by perforations 142, forms drawstrings 128*a* in bag 200. Hem 125 is shown defined in front panel 200*a*. Bag 200 can further have drawstring cutouts 150 for a user to access drawstring 128*a* as shown by FIGS. 4 and 5.

FIGS. 6A-6B and 7-9 illustrate further embodiments of the invention. The embodiments of FIGS. 6A-6B and 7-9 forms a multilayer bag from flattened tube 100 as previously discussed for FIGS. 1-5. However, rather than slitting and inserting draw tape film as described for FIGS. 2C-2E, the folded over flattened tube 100 of FIG. 2B is used to construct a drawstring bag by folding back edges 110 and 112 to form hems for encapsulating a draw tape.

As shown in FIG. 6A, first and second edges 110 and 112 of tube 100 can be folded back towards opposite third edge 114 of tube 100. In at least one embodiment, edges 110 and 112 are folded towards the first layer 102 of tube to form first and second overlap sections 145 and 147. The folding of edges 110 and 112 forms fourth and fifth outer edges 144 and 146 in tube 100 which are located opposite from third edge 114. As further shown by FIG. 6A, a first hem seal 160 can be placed in first overlap section 145 and first tube half 106. Additionally, a second hem seal 162 can be placed into second overlap section 147 and second half 108 of tube 100.

FIG. 6A further shows a first overlap hem 164 defined by the first overlap section 145, the first tube half 106 and the first hem seal 160. Additionally, a second overlap hem 166 is defined by the second overlap section 147, the second half 108, and second hem seal 162. Prior to the formation of the hem seals 160 and 162, draw tape 128 can be inserted into hems 164 and 166. FIG. 6A also shows that first hem seal 160 seals together the first and second layers 102 and 104 of the first overlap section 145 to the first and second layers 102 and 104 of first tube half 106. Application of first and second hem seals 160 and 162 results in overlap sections 145 and 147 contacting directly first surface 102 of tube 100 at first and second halves 102*a* and 102*b*. Additionally, the second hem seal 162 seals together the first and second layers 102 and 104 of the second overlap section 147 to the first and second layers 102 and 104 of the second tube half 108. Seal 160 can also seal the first layer of the first half 102*a* to the second layer of the first half 104*a* and seal 162 can seal the first layer of the second half 102*b* to the second layer of the second half 104*b*.

FIG. 6B illustrates a further embodiment of the invention that is similar to the FIG. 6A invention. However, rather than first and second ends 110 and 112 being folded towards outer first layer 102 as shown in FIG. 6A, FIG. 6B shows first and second edges 110 and 112 folded towards inner second layer 104. Thus, first overlap section 145 is in direct contact with first half 104*a* of second layer 104 at first hem seal 160 and second overlap section 147 is in direct contact with second half 104*b* of second layer 104 at second hem seal 162. Reference is made to the discussion of FIG. 6A for further discussion of the FIG. 6B embodiment due to shared construction of the two embodiments.

Now turning to FIG. 7A, steps for converting collapsed tube 100 of FIG. 6A into a plurality of bags is illustrated. As previously discussed for the FIG. 3A embodiment, the plurality of pairs of closely spaced seals 140 can be placed in tube 100 with seals 140 extending in the cross direction. In between each pair of seals 140 can be placed perforation 142. Each seal of the pair of closely spaced seals 140 forms a side seal for a bag formed from tube 100. Each perforation 142 may be severed to form a plurality of individual bags. Reference is made to the discussion of FIG. 6A for the additional features shown by FIG. 7A.

Now examining FIG. 7B, a schematic partial cross-sectional view is shown which illustrates the multiple layers of film sealed together by each seal 140 of FIG. 7A at hems 164 and 166. FIG. 7B shows that each one of seals 140 seals together first and second layers 102*a* and 104*a* of the first overlap section 145, the first draw tape 128 of the first overlap section 145, first and second layers 102*a* and 104*a* of the first half 106 of tube 102, first and second layers 102*b* and 104*b* of the second half 108 of tube 100, draw tape 128 of the second overlap section 147, and first and second layers 102*b* and 104*b* of the second overlap section 147. Thus, each one of the seals 140 results in ten layers of film sealed together at hems 164 and 166.

Shown in FIGS. 8 and 9 is an individual bag 300 formed from tube 100 of FIGS. 6 and 7A. FIG. 8 shows a front panel 300*a* and a rear panel 300*b* of bag 300 while FIG. 9 shows only front panel 300*a*. The structure of front and rear panels of bag 300 is identical. FIGS. 8 and 9 show opposing side edges 142*a* and 142*b* of bag 300 formed from perforations 142 of FIG. 7A. The fourth and fifth outer edges 144 and 146 of tube 100 of FIG. 7A form the top edges of bag 300. Seals 140 of FIG. 7A form opposing first and second side seals 140*a* and 140*b* in bag 300. Seal 160 defines a first hem seal in front panel 300*a* and seal 162 defines a second hem seal in rear panel 300*b*. Draw tape 128, once severed by perforations 142, forms drawstring 128*a* in bag 300. Hem 164 is shown defined in front panel 300*a* of bag 300. Bag 300 is further shown with drawstring cutouts 150 to provide access to drawstrings 128*a*.

In certain embodiments of the invention, it may be desirable to emboss a pattern into the film of tube 100. FIGS. 10 and 11 shows tube 100 with embossing pattern 600 applied to tube 100. This embossing pattern of FIGS. 10 and 11 is discussed in detail in the Cobler patent referenced in the Background of the Invention. As applied to tube 100, the pattern allows the flattened tube 100 to expand in the cross direction. When tube 100 is converted into bags as previously discussed, the cross direction corresponds to the lengthwise direction of the bags such that as additionally debris are loaded into the bags, the bags may expand and grow in height. This embossing pattern may also provide a certain amount of adhesion between the first and second layers 102 and 104 of tube 100; however, as one skilled in the art would understand, the embossing of tube 100 is not expected to bond the layers together under typical process conditions.

Shown in FIG. 12 is a detailed schematic view of the embossed pattern as illustrated generally in FIGS. 11 and 13-15. The embossed pattern 600 has a plurality of embossed regions 610, each embossed region 610 having a generally hexagonal shape with each embossed region 610 separated by a continuous unembossed arrangement 620. One of the hexagonal shapes is indicated by dashed lines B in FIG. 12. The dashed lines of B are shown for reference only and form no structure of the disclosed invention. Each embossed region 610 is shown as defined by nine parallel and adjacent linear embosses 630. The two opposing horizontally extending sides of each embossed region 610 is defined by three middle adjacent parallel linear embosses 630 with equal length; each horizontal side of the hexagon formed by adjacent ends of the three linear embosses 630. Each of the other four diagonal sides of the hexagon can be defined by an endpoint of an outer emboss of the three middle adjacent linear embosses 630 and adjacent end points of three other outer adjacent linear embosses 630. Each of the three other adjacent linear embosses 630 can decrease in length the same amount as the adjacent linear emboss 630.

The hexagonal shaped embossed regions 610 of FIG. 12 can be oriented such that opposing vertices of each hexagon are at a left and right side of each hexagon as illustrated in FIG. 12. Adjacent to the vertices can be two short opposing, linear embosses 630 at each end of each embossed region 610. These opposing vertices encourage each embossed region to fold-in when the linear embosses unfold in the horizontal direction. Hence, a film with the embossed pattern 600 of FIG. 12 expands in the horizontal direction but not in vertical direction. This expansion is much greater and at a much lower force than would be required to stretch the unembossed film.

Methods of forming the embossing pattern of FIG. 12 is further discussed in U.S. Patent Appl. Publ. No. 2017/0113872 to Brad A. Cobler and assigned to Poly-America, L.P., filed on Jan. 4, 2017, which is hereby incorporated by reference. The embossing pattern 600 in FIG. 12 is shown oriented at 90 degrees in relation to the embossing pattern 600 as shown in FIGS. 10-11 and 13-15.

Now returning to FIGS. 10 and 11, the embossing pattern may not be applied to an entire width of tube 100, the width extending in the cross direction of tube 100 from first to second edges 110 and 112 of tube 100. Rather, pattern 600 may be applied in a plurality of partial widths, such as first and second partial pattern widths 600*a* and 600*b*, which result in a plurality of unembossed partial widths 602. While the embossing pattern 600 is not applied to the entire width of tube 100, FIGS. 10 and 11 shows the embossing pattern 600 extending continuously in the machine direction on tube 100.

It may be desirable to not emboss certain sectional widths of tube 100 for various reasons. For instance, it may desirable not to emboss a partial width that is coextensive with central axis A of tube 100 so as not to interfere with the folding of tube 100. Additionally, if the bottom edge of the resultant bags is defined by central axis A, it may desirable to not emboss this location to alleviate the risk of improperly formed embossing patterns resulting in liquid leaking from bags formed from tube 100. Furthermore, partial widths adjacent to first and second edges may not be embossed so as not to interfere with the formation of the hem in the upper area of a resultant bag and to provide an area of the bag for a user to grasp without the flexing due to the disclosed embossing pattern.

As shown in FIGS. 11, these partial widths may be formed by intermeshing rollers 404 and 406. Upper roller 404 may have the embossing pattern defined about its circumference. However, bands of its circumference may have the pattern removed with the diameter of these bands slightly less than the width of roller 404 due to the absence of the pattern. FIG. 11 shows first, second, third un-patterned bands, 404*a*, 404*c*, and 404*e* with the pattern not defined on the surface of roller 404. Further shown are patterned bands 404*b* and 404*d* with the pattern defined on roller 404. Alternatively, a length of roller 404 may simply be shorter than the width of tube 100 such that an area adjacent to first and second edges 110 and 112 of tube 100 are not embossed.

As further shown by FIG. 11, when flattened tube 100 passes through nip 408 of rollers 404 and 406, the embossing pattern on the rollers is formed onto tube 100. As a result, first and second embossed sections 600*a* and 600*b* are formed, as shown by FIGS. 10 and 11, which define first, second, and third unembossed sections 602*a*, 602*b*, and 602*c*.

In a particular embodiment, the width of flattened tube 100 can be 48 inches. Furthermore, the width of first unembossed section 602*a* between first edge 110 of tube 100 and outer edge 600*a*1 of first embossed section 600*a*, as shown by FIGS. 10 and 11, can be approximately five inches. The width of second unembossed section 602*b* between second edge 112 of tube 100 and outer edge 600*b*1 of second embossed section 600*b* can also be approximately five inches. Additionally, the width of the third unembossed section 602*c* between first and second inner edges 600*a*2 and 600*b*2 of first and second embossed sections 600*a* and 600*b*, as further shown by FIGS. 10 and 11, can be approximately four inches. Thus, the width of each embossed section, first and second embossed sections 600*a* and 600*b*, can be approximately seventeen inches.

Once tube 100 is embossed as illustrated by FIG. 11, the tube can be folded as previously discussed regarding FIG. 2*b*. Draw tape 128 can be inserted into the embossed tube of FIG. 11 as previously illustrated by FIGS. 2C-2E. FIG. 13 shows tube 100 after undergoing the steps of FIGS. 2C-2E, as discussed above. The tube of FIG. 13 shares the same structure of previously discussed tube 100 of FIG. 3A; however, the FIG. 13 embodiment further includes embossed section 600*a*, as discussed for FIG. 11. Furthermore, the previously discussed dimensions of unembossed sections 602*a* and 602*c* and embossed section 600*a* can be the same as discussed above for FIG. 11. Thus, with tube 100 folded in half, the distance from second edge 114 of tube 100 to inner edge 600*a*2 of first embossed section 600*a*, one-half the width of third unembossed section 602*c*, can be approximately two inches. Furthermore, the distance from first edge 110 to outer edge 600*a*1 of first embossed section 600*a*, the width of first unembossed section 602*a*, can be approximately five inches as previously discussed.

FIGS. 14 and 15 illustrate drawstring trash bag 400 formed by the method illustrated by FIGS. 2C-2E and 10-13. Bag 400 of FIGS. 14 and 15 shares the same construction as that of bag 200 of FIGS. 4 and 5 except for the addition of embossing pattern 600 of FIG. 12 by the method illustrated by FIGS. 10-11 and 14. Bag 400 includes a partial length of embossed section 600*a*. Further shown is a partial length of first and third unembossed sections 602*a* and 602*c*. Reference is made to the discussion of FIGS. 4 and 5 regarding the features of bag 400 shown by FIGS. 14 and 15 not addressed here due to the similar construction of the embodiments.

As previously noted, the specific embodiments depicted herein are not intended to limit the scope of the present invention. Indeed, it is contemplated that any number of different embodiments may be utilized without diverging from the spirit of the invention. Therefore, the appended claims are intended to more fully encompass the full scope of the present invention.

We claim:

1. A bag formed from a collapsed tube of polymeric film, the collapsed tube extruded in a machine direction, the bag comprising:
   front and rear panels, the front and rear panels joined to each other along opposing first and second side edges, the first and second edges extending generally in a cross direction, the cross direction perpendicular to the machine direction,
   the front and rear panels each having separate outer and inner layers of polymeric film,
   the front and rear panels joined at a bottom edge, the bottom edge extending generally in the machine direction,
   an upper edge opposite the bottom edge, an opening of the bag defined about the upper edge,
   first and second inner edges defined in the inner layer of the front panel and below the upper edge, the first and second inner edges extending generally in the machine direction,
   a first drawstring between the inner and outer layers of the front panel, the first drawstring between the upper edge and the first inner edge, the first drawstring extending generally in the machine direction,
   the first inner edge above the second inner edge, the first inner edge below a bottom end of the first drawstring,
   a gap between the first inner edge and the second inner edge,
   the second inner edge proximate to the first inner edge,
   the bottom edge defined by a fold in the inner and outer layers of the front and rear panels, and
   the gap less than a height of the first drawstring.

2. The bag of claim 1 further comprising:
   the first drawstring extending generally from the first side edge to the second side edge, and
   the first inner edge proximate to the bottom end of the first drawstring.

3. The bag of claim 1 further comprising:
   a first inner seal above the first inner edge and below the first drawstring, the first inner seal extending generally in the machine direction, and
   a second inner seal below the second inner edge, the second inner seal extending generally in the machine direction.

4. The bag of claim 1 further comprising:
   a first side seal joining the front and rear panels to each other proximately along the first side edges and a second side seal joining the front and rear panels to each other proximately along the second side edges, the first and second side seals, and the first and second side edges generally parallel to each other.

5. The bag of claim 4 further comprising:
   the first and second side seals sealing together the inner and outer layers of the front and rear panels, the first drawstring, and a second drawstring.

6. A bag formed from a collapsed tube of polymeric film, the collapsed tube extruded in a machine direction, the bag comprising:
   front and rear panels, the front and rear panels joined to each other along first and second side edges, the side edges extending generally in a cross direction, the cross direction perpendicular to the machine direction,
   the front and rear panels each having outer and inner layers of polymeric film,
   the front and rear panels joined at a folded bottom edge,
   an upper edge opposite the bottom edge, an opening of the bag defined about the upper edge,
   first and second inner edges defined in the inner layer of the front panel and below the upper edge,
   a first drawstring between the inner and outer layers of the front panel, the first drawstring between the upper edge and the first inner edge,
   the first inner edge above the second inner edge, the first inner edge below a bottom end of the first drawstring, and
   a gap between the first inner edge and the second inner edge, the gap having a distance less than a height of the first drawstring.

7. The bag of claim 6 further comprising:
   the first inner edge proximate to the first drawstring and the second inner edge proximate to the first inner edge.

8. The bag of claim 6 further comprising:
a first inner seal above the first inner edge and below the upper edge,
a second inner seal below the second inner edge, and
the firsts and second inner seals extending generally in the machine direction.

9. The bag of claim 6 further comprising:
the first and second inner edges extending generally in the machine direction, and
the upper edge generally parallel to the bottom edge.

10. The bag of claim 6 further comprising:
the first drawstring extending generally from the first side edge to the second side edge, and
the first inner edge proximate to the bottom end of the first drawstring.

11. The bag of claim 6 further comprising:
a first side seal joining the front and rear panels to each other proximately along the first side edges and a second side seal joining the front and rear panels to each other proximately along the second side edges.

12. The bag of claim 11 further comprising:
the first and second side seals each sealing together the inner and outer layers of the front and rear panels, the first drawstring, and a second drawstring.

13. A bag formed from a collapsed tube of polymeric film, the collapsed tube extruded in a machine direction, the bag comprising:
front and rear panels, the front and rear panels joined to each other along opposing first and second side edges,
the front and rear panels each having outer and inner layers of polymeric film,
the front and rear panels joined at a bottom edge,
an upper edge opposite the bottom edge, an opening of the bag defined about the upper edge, the upper edge defined in both the front and rear panels,
first and second inner edges defined in the inner layer of the front panel and below the upper edge,
a first drawstring between the inner and outer layers of the front panel, the first drawstring between the upper edge and the first inner edge,
the first inner edge above the second inner edge, the first inner edge below a bottom end of the first drawstring,
a gap between the first inner edge and the second inner edge,
the bottom edge formed by a fold in the front and rear panels, the bottom edge extending generally in the machine direction,
the first and second inner edges extending generally in the machine direction, and
the gap less than a height of the first drawstring.

14. The bag of claim 13 further comprising:
the first drawstring extending generally from the first side edge to the second side edge in the machine direction, and
the first inner edge proximate to the bottom end of the first drawstring.

15. The bag of claim 13 further comprising:
the first inner edge proximate to the bottom end of the first drawstring,
the second inner edge proximate to the first inner edge,
a first inner seal above the first inner edge and below the upper edge, and
a second inner seal below the second inner edge.

16. The bag of claim 13 further comprising:
a first side seal joining the front and rear panels to each other proximately along the first side edges and a second side seal joining the front and rear panels to each other proximately along the second side edges.

17. The bag of claim 16 further comprising:
the first and second side seals sealing together the inner and outer layers of the front and rear panels, the first drawstring, and a second drawstring.

18. The bag of claim 13 further comprising:
a drawstring cutout defined along the upper edge between the first and second side edges.

* * * * *